US009113368B2

(12) United States Patent
Nagaraja et al.

(10) Patent No.: US 9,113,368 B2
(45) Date of Patent: *Aug. 18, 2015

(54) MAINTAINING NEIGHBOR CELL LIST

(75) Inventors: Sumeeth Nagaraja, San Diego, CA (US); Farhad Meshkati, San Diego, CA (US); Damanjit Singh, San Diego, CA (US); Vinay Chande, San Diego, CA (US); Andrei Dragos Radulescu, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 551 days.

This patent is subject to a terminal disclaimer.

(21) Appl. No.: 13/427,659

(22) Filed: Mar. 22, 2012

(65) Prior Publication Data

US 2013/0079003 A1 Mar. 28, 2013

Related U.S. Application Data

(60) Provisional application No. 61/467,844, filed on Mar. 25, 2011.

(51) Int. Cl.
*H04W 72/00* (2009.01)
*H04W 24/10* (2009.01)
(Continued)

(52) U.S. Cl.
CPC .............. *H04W 24/10* (2013.01); *H04W 24/02* (2013.01); *H04W 48/12* (2013.01)

(58) Field of Classification Search
CPC ............ H04W 36/34; H04W 36/0005; H04W 36/0083; H04W 36/0055
USPC ........... 455/439, 424, 415, 435.1, 452.2, 566; 370/328, 331
See application file for complete search history.

(56) References Cited

U.S. PATENT DOCUMENTS 6,505,043 B1   1/2003  Aihara
7,013,141 B2   3/2006  Lindquist et al.
(Continued)

FOREIGN PATENT DOCUMENTS

EP    1422959 A1    5/2004
EP    2079263 A1    7/2009
(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), 3GPP Standard; 3GPP TS 36.300, 3rd Generation Partnership Project (3GPP), Mobile Competence Centre; 650, Route des Lucioles; F-06921 Sophia-Antipolis Cedex; France, No. V10.2.0, Dec. 18, 2010, pp. 1-200, XP050462130, retrieved on Dec. 18, 2010.

(Continued)

*Primary Examiner* — Shahriar Behnamian

(57) ABSTRACT

Access terminals are provisioned to conduct intra-frequency, inter-frequency, and inter-RAT measurements and report physical layer identifiers of detected cells. The provisioning may involve cycling through all or a portion of a defined superset of physical layer identifier one subset at a time. In addition, the physical layer identifiers may be prioritized to improve the search procedure. Measurement report messages (including physical layer identifiers of the detected cells) are received at an access point as a result of the provisioning. A neighbor cell list for the femtocell is maintained based on the received measurement report messages and, optionally, other information. This other information may related to, for example, one or more of: physical layer identifier information received from access terminals that register with the access point, physical layer identifier information received via network listen operations, information regarding co-located cells, or physical layer identifier information received from a network entity.

38 Claims, 15 Drawing Sheets

(51) Int. Cl.
*H04W 24/02* (2009.01)
*H04W 48/12* (2009.01)

(56) References Cited

U.S. PATENT DOCUMENTS

| | | | |
|---|---|---|---|
| 7,065,361 | B1 | 6/2006 | Fortuna |
| 7,319,852 | B2 | 1/2008 | Schlegel et al. |
| 7,369,852 | B2 | 5/2008 | Newberg et al. |
| 7,706,304 | B2 | 4/2010 | Sinicrope et al. |
| 7,924,785 | B2 | 4/2011 | Shaheen et al. |
| 8,090,376 | B2 | 1/2012 | Tolli et al. |
| 8,107,950 | B2 | 1/2012 | Amirijoo et al. |
| 8,190,155 | B2 | 5/2012 | Roy et al. |
| 8,838,090 | B2 * | 9/2014 | Gunnarsson et al. ......... 455/423 |
| 8,855,007 | B2 | 10/2014 | Gupta et al. |
| 2004/0002328 | A1 | 1/2004 | Chandra et al. |
| 2004/0142699 | A1 | 7/2004 | Jollota et al. |
| 2005/0153667 | A1 | 7/2005 | Cave et al. |
| 2005/0255847 | A1 | 11/2005 | Han et al. |
| 2006/0040700 | A1 | 2/2006 | Roberts et al. |
| 2007/0097938 | A1 | 5/2007 | Nylander et al. |
| 2007/0218920 | A1 | 9/2007 | Bolin |
| 2007/0232307 | A1 | 10/2007 | Ibrahim et al. |
| 2008/0064404 | A1 | 3/2008 | Zhang et al. |
| 2008/0188215 | A1 * | 8/2008 | Bergstrom et al. ........... 455/424 |
| 2008/0207207 | A1 * | 8/2008 | Moe et al. ..................... 455/439 |
| 2009/0003279 | A1 | 1/2009 | Abusch-Magder et al. |
| 2009/0005052 | A1 | 1/2009 | Abusch-Magder et al. |
| 2009/0047958 | A1 | 2/2009 | Rimhagen et al. |
| 2009/0052382 | A1 | 2/2009 | Stephenson et al. |
| 2009/0092098 | A1 | 4/2009 | Kim |
| 2009/0176490 | A1 * | 7/2009 | Kazmi et al. .................. 455/434 |
| 2010/0056148 | A1 | 3/2010 | Kellil et al. |
| 2010/0203891 | A1 | 8/2010 | Nagaraja et al. |
| 2010/0238871 | A1 | 9/2010 | Tosic et al. |
| 2010/0242103 | A1 | 9/2010 | Richardson et al. |
| 2010/0273481 | A1 | 10/2010 | Meshkati et al. |
| 2011/0130144 | A1 | 6/2011 | Schein et al. |
| 2011/0207456 | A1 | 8/2011 | Radulescu et al. |
| 2011/0228687 | A1 | 9/2011 | Catovic et al. |
| 2013/0079007 | A1 | 3/2013 | Nagaraja et al. |
| 2014/0135021 | A1 | 5/2014 | Radulescu et al. |

FOREIGN PATENT DOCUMENTS

| | | | |
|---|---|---|---|
| EP | 2224770 | A1 | 9/2010 |
| GB | 2331892 | A | 6/1999 |
| JP | 2000333232 | A | 11/2000 |
| JP | 2003259433 | A | 9/2003 |
| JP | 2008219645 | | 9/2008 |
| JP | 2010118986 | A | 5/2010 |
| JP | 2010278802 | A | 12/2010 |
| KR | 20120007339 | A | 1/2012 |
| KR | 20130031816 | A | 3/2013 |
| WO | 2005089249 | A2 | 9/2005 |
| WO | 2006115739 | A2 | 11/2006 |
| WO | WO-2008090914 | A1 | 7/2008 |
| WO | 2008095542 | A1 | 8/2008 |
| WO | 2008113373 | A1 | 9/2008 |
| WO | WO2009040764 | A1 | 4/2009 |
| WO | WO-2009067452 | | 5/2009 |
| WO | 2009088332 | A1 | 7/2009 |
| WO | WO 2009088332 | A1 * | 7/2009 |
| WO | WO-2010002317 | A1 | 1/2010 |
| WO | WO2010149829 | A1 | 12/2010 |
| WO | WO-2011018640 | A1 | 2/2011 |
| WO | WO-2011024310 | A1 | 3/2011 |
| WO | WO2011160009 | A2 | 12/2011 |

OTHER PUBLICATIONS

Ericsson et al: "Method for ANR support in UTRAN", 3GPP Draft; R2-106442 Method for ANR Support in UTRAN, 3rd Generation Partnership Project (3GPP), Mobile Competence Centre; 650, Route des Lucioles; F-06921 Sophia-Antipolis Cedex; France, vol. RAN WG2, no. Jacksonville, USA; 20101115, Nov. 9, 2010, XP050492277, [retrieved on Nov. 9, 2010].

ETSI: "Draft Meeting Report for 36PP TSG SA WG5 meeting #57", 3GPP Draft; S5-080489_MeetingReport_S5-57_Feb. 19, 2008_07H58, 3rd Generation Partnership Project (3GPP), Mobile Competence Centre; 650, Route des Lucioles; F-06921 Sophia-Antipolis Cedex; France, vol. SA WG5, no. St Julian, Malta; 20080226, Feb. 26, 2008, XP050307081, [retrieved on Feb. 26, 2008].

Huawei: "Aligment of SON use cases for optimization", 3GPP Draft; R3-080356_SON_UC_Alignment, 3rd Generation Partnership Project (3GPP), Mobile Competence Centre; 650, Route des Lucioles; F-06921 Sophia-Antipolis Cedex; France, vol. RAN WG3, no. Sorrento, Italy; 20080205, Feb. 5, 2008, XP050163564, [retrieved on Feb. 5, 2008].

Huawei et al: "Discussion on UMTS ANR non-Cell DCH based approach (log approach)", 3GPP Draft; R2-106257 Discussion on UMTS ANR Non Cell_DCH Based Approach (Log Approach), 3rd Generation Partnership Project (3GPP), Mobile Competence Centre; 650, Route des Lucioles; F-06921 Sophia-Antipolis Cedex; France, vol. RAN WG2, no. Jacksonville, USA; 20101115, Nov. 8, 2010, XP050492078, [retrieved on Nov. 8, 2010].

Huawei et al: "Introduction of UTRAN Automatic Neighbor Relation", 3GPP Draft; 25.304_CRXXXX_(REL-10)_R2-110185, 3rd Generation Partnership Project (3GPP), Mobile Competence Centre; 650, Route des Lucioles; F-06921 Sophia-Antipolis Cedex; France, vol. RAN WG2, no. Dublin, Ireland; 20110117, Jan. 11, 2011, XP050474244, [retrieved on Jan. 11, 2011].

International Search Report and Written Opinion—PCT/US2012/030570—ISA/EPO—May 21, 2012.

3GPP TS 44.060 v8.7.0 (Feb. 2010), Digital cellular telecommunications system (Phase 2+); General Packet Radio Service (GPRS); Mobile Station (MS)—Base Station System (BSS) interface; Radio Link Control/ Medium Access Control (RLC/MAC) protocol (Release 8), Feb. 2010, ETSI, pp. 1-587.

Wikipedia, "3GPP Long Term Evolution (LTE)," Feb. 8, 2010, pp. 1-13.

Wikipedia, "Radio Network Controller (RNC)," Feb. 9, 2009, pp. 1-3.

ETSI TS 125 331 v9.5.0; "Universal Mobile Telecommunications System (UMTS); Radio Resource Control (RRC)", 3GPP TS 25.331 version 9.5.0 Release 9 (Mar. 2011).

* cited by examiner

MAINTAINING NEIGHBOR CELL LIST

CLAIM OF PRIORITY

This application claims the benefit of and priority to commonly owned U.S. Provisional Patent Application No. 61/467,844, filed Mar. 25, 2011, the disclosure of which is hereby incorporated by reference herein.

BACKGROUND

Field

This application relates generally to wireless communication and more specifically, but not exclusively, to neighbor cell list creation and management for femtocells and other access points.

INTRODUCTION

A wireless communication network may be deployed over a defined geographical area to provide various types of services (e.g., voice, data, multimedia services, etc.) to users within that geographical area. In a typical implementation, macro access points (e.g., each of which corresponds to one or more macrocells) are distributed throughout a network to provide wireless connectivity for access terminals (e.g., cell phones) that are operating within the geographical area served by the network.

A macro network deployment is carefully planned, designed and implemented to offer good coverage over the geographical area. Even with such careful planning, however, such a deployment may not completely accommodate channel characteristics such as path loss, fading, multipath, shadowing, etc., in indoor and potentially other environments. Consequently, macrocell users may face coverage issues (e.g., call outages and quality degradation) indoors and at other locations, resulting in poor user experience.

To supplement conventional network access points (e.g., macro access points) and provide enhanced performance, low-power access points may be deployed to provide coverage for access terminals over relatively small coverage areas. For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.).

In various implementations, low-power access points may be referred to as, for example, femtocells, femto access points, home NodeBs, home eNodeBs, access point base stations, picocells, etc. In some implementations, such low-power access points are connected to the Internet and the mobile operator's network via a Digital Subscriber Line (DSL), cable internet access, T1/T3, or some other suitable means of connectivity. In addition, a low-power access point may offer typical base station functionality such as, for example, Base Transceiver Station (BTS) technology, a radio network controller, and gateway support node services.

In practice, femtocells may be deployed with minimal planning. Consequently, it is desirable for femtocells to be capable of self-configuring and self-organizing in terms of choosing available radio resources such as, for example, frequency and physical layer identifiers (e.g., primary scrambling codes (PSCs)), and in terms of identifying neighbor cells. However, creating and managing an accurate neighbor cell list (NCL) at a femtocell in unplanned deployments tends to be a relatively challenging task. In contrast with macro access points, the location of femtocell installations may not be known a priori to the operator. Moreover, a femtocell is not necessarily fixed in location during its operating life. For example, a femtocell may be initially installed near a window in an enterprise and later moved indoors due to interference considerations. As another example, a femtocell installed in an apartment unit may be carried to another apartment in another city. At different locations of femtocell installation, the surrounding radiofrequency (RF) conditions and neighbor access points (e.g., macrocells, picocells and femtocells) will likely be different and, therefore, the NCL at the femtocell should be reconstructed. Furthermore, due to RF mismatch, in which the cells that are seen at the femtocell may be different from the cells seen by an access terminal served by the femtocell at various locations of the access terminal, the NCL at the femtocell may not be sufficiently accurate (e.g., for conditions near the outer boundaries of the coverage area).

It is important that the NCL, at the femtocell, is configured correctly. That is, an NCL (e.g., for intra-frequency, inter-frequency and inter-RAT) should contain the physical layer identifiers of all nearby access points (macrocells, picocells, and femtocells).

Incorrect configuration of an NCL may result in poor performance in idle and active mode mobility. Regarding active mobility, an access terminal that is connected to the femtocell and moving out of the femtocell coverage area will likely experience handover failures and call drops. Regarding idle mobility, an access terminal that is camping on the femtocell and moving out the femtocell coverage may briefly go out-of-service during which it cannot receive any pages from the network.

Furthermore, providing an accurate construction of radiofrequency (RF) interference characteristics in the desired femtocell coverage area may require having a correct NCL at the femtocell. An incorrect NCL may result in incorrect representation of macrocell RF interference characteristics in the desired femtocell coverage area. This is applicable to all methods that rely on access terminal reports to construct a macrocell RF interference profile in the surrounding area. For instance, macrocell RF information is used in femtocell downlink transmit power calibration algorithms, in algorithms that limit uplink interference to macrocells by capping femtocell access terminal transmit power level, and so on.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to maintaining a neighbor cell list (NCL) for low-power access points (e.g., femtocells) or other types of access points. The NCL for a given access point generally includes, at a minimum, a physical layer identifier (e.g., a primary scrambling code in UMTS) associated with each neighbor access point that is near the access point.

The disclosure relates in some aspects to maintaining (e.g., creating and managing) an NCL for an access point based on measurement reports received from access terminals (e.g., UEs, mobiles, etc.). For example, the access point may provision access terminals being served by the access point to conduct measurements for nearby cells. Upon receiving a measurement report message from an access terminal, the access point determines whether the message identifies (e.g., includes) any physical layer identifiers that are not in the access point's current NCL. If the message does identify such a physical layer identifier, the access point may add that physical layer identifier to the NCL and take action to determine the cell identifier associated with that cell (e.g., communicate with an appropriate server). Conversely, if the message does not identity such a physical layer identifier, the access point may remove that physical layer identifier from the NCL, if present.

Accordingly, in some aspects, a communication scheme implemented according to the teachings herein may involve the functions that follow. At least one access terminal is provisioned to report physical layer identifiers of cells detected by the access terminal(s). Measurement report messages are received at a femtocell as a result of the provisioning, wherein the measurement report messages identify physical layer identifiers of the cells detected by the access terminal(s). A neighbor cell list for the femtocell is maintained based on the received measurement report messages. The resulting neighbor cell list is then broadcast by the femtocell so that nearby access terminals may use the neighbor cell list (e.g., for mobility operations and/or other operations).

An access point may provision an access terminal to conduct measurements and send measurement reports in various ways. In some embodiments, an access point enables Dedicated Set reporting so that access terminals will report the results of intra-frequency measurements (e.g., including physical layer identifiers that are not in the access point's advertised NCL). As another example, an access point may request that an access terminal conduct inter-frequency and/or inter-RAT measurements for specified physical layer identifiers. Here, the access point may cycle through all or a portion of a defined superset of physical layer identifier (e.g., comprising 512 PSCs) one subset at a time (e.g., using a subsets of 32 PSCs).

The disclosure relates in some aspects to prioritizing the physical layer identifiers to be searched. For example, the specific physical layer identifiers to be searched (e.g., a set of 32 PSCs) may be selected based on prioritization of the identifiers. As another example, the femtocell may prioritize the identifiers of a given set so that an access terminal searches for those identifiers in a certain order.

In some embodiments, the NCL is maintained based on physical layer identifier information received from access terminals that register with the access point. For example, physical layer identifiers identified by a registration message from an access terminal may be added to the NCL.

In some embodiments, the NCL is maintained based on physical layer identifier information received via network listen operations. For example, a network listen module (NLM) of an access point may detect a physical layer identifier of a neighbor access point from a signal transmitted by the neighbor access point. In this case, the access point may add the detected physical layer identifier to the NCL. As another example, the NLM may decode system information broadcast by a neighbor access point, where the system information includes an NCL for the neighbor access point. In this case, the access point may add the physical layer identifiers from the received NCL to the access point's NCL.

In some embodiments, the NCL is maintained based on information regarding co-located cells. For example, a set of co-located cells may involve a first cell on a first frequency and a second cell on a second frequency, where both cells employ the same physical layer identifier (and may have comparable coverage). In the event a physical layer identifier of the first cell is in the NCL (for the first frequency), the access point may thus add that physical layer identifier to the NCL (for the second frequency) since it is likely that the physical layer identifier will be detectable on the second frequency as well.

In some embodiments, the NCL is maintained based on physical layer identifier information received from a network entity. For example, an access point may send an identifier associated with the access point (e.g., GPS coordinates, a physical layer identifier, etc.) to the network entity and the network entity may respond with a list of physical layer identifiers corresponding to access points in the vicinity of the access point. The access point may then add the physical layer identifiers received from the network entity to the access point's NCL.

BRIEF DESCRIPTION OF THE DRAWINGS

These and other sample aspects of the disclosure will be described in the detailed description and the claims that follow, and in the accompanying drawings, wherein:

Figure 1:
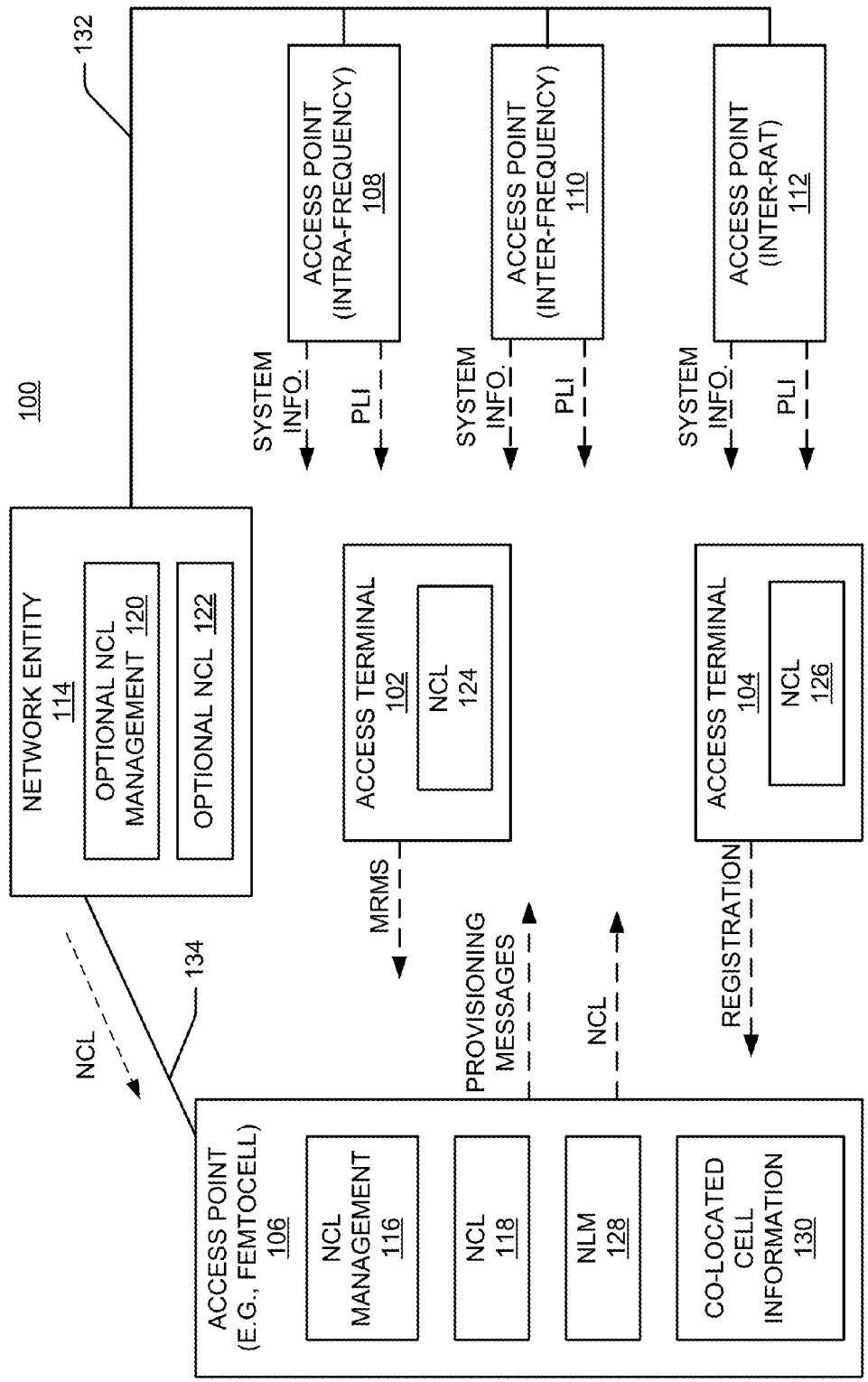
FIG. 1 is a simplified block diagram of several sample aspects of a communication system wherein an NCL for an access point is maintained.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a wireless communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, macrocells, femtocells, and so on, while access terminals may be referred to or implemented as user equipment (UEs), mobiles, and so on.

Access points in the system 100 provide access to one or more services (e.g., network connectivity) for one or more wireless terminals (e.g., access terminals 102 and 104) that may be installed within or that may roam throughout a coverage area of the system 100. For example, at various points in time the access terminal 102 may connect to an access point 106, an access point 108, an access point 110, an access point 112, or some access point in the system 100 (not shown). Similarly, at various points in time the access terminal 104 may connect to any of these access points.

The access points depicted in FIG. 1 may employ different frequencies and/or different radio access technologies (RATs). For example, relative to the access point 106, the access point 108 is intra-frequency (e.g., operating on the same carrier frequency). Relative to the access point 106, the access point 110 is inter-frequency (e.g., operating on a different carrier frequency). Relative to the access point 106, the access point 112 is inter-RAT (e.g., employing a different RAT).

As represented in a simplified manner by the lines 132 and 134, each of the access points may communicate with one or more network entities (represented, for convenience, by a network entity 114), including each other, to facilitate wide area network connectivity. These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, radio resource management, or some other suitable network functionality. Also, two of more of these network entities may be co-located and/or two or more of these network entities may be distributed throughout a network. Various communication technologies may be employed by a given network entity to communicate with other network entities (e.g., intra-RAT and/or inter-RAT). In addition, the network entities may comprise part of a Session Initiation Protocol (SIP) based circuit-switched network, an Interoperability Specification (IOS) based circuit-switched network, a packet-switched network, or some other suitable wireless communication network.

Some of the access points (e.g., the access points 106 and 108) in the system 100 may comprise low-power access points. A low-power access point will have a maximum transmit power that is less (e.g., by an order of magnitude) than a maximum transmit power of any macro access point in a given coverage area. In some embodiments, low-power access points such as femtocells may have a maximum transmit power of 20 dBm or less. In some embodiments, low-power access points such as picocells may have a maximum transmit power of 24 dBm or less. In contrast, a macrocell may have a maximum transmit power of 43 dBm. It should be appreciated, however, that these or other types of low-power access points may have a higher or lower maximum transmit power in other embodiments. For convenience, low-power access points may be referred to as femtocells or femto access points in the discussion that follows. Thus, it should be appreciated that any discussion related to femtocells or femto access points herein may be equally applicable, in general, to low-power access points or other types of access points.

As mentioned above, it is important to provide an accurate NCL for a femtocell. In some scenarios (e.g., due to blockage caused by buildings or other structures), the access point 106 is unable to detect radio signals from neighbor access points (e.g., access points 108-112), and therefore will not be able to correctly populate the NCL list for an access terminal (e.g., access terminal 102) if the access point 106 relies only on its own detection capabilities. The present disclosure, among other things, provides methodologies for the access point 106 (or other access points) to make up for deficiencies in the ability of the access point to detect neighbor access points due to blocking, an invisible node issue, or other reception limitations.

In some aspects, a framework is provided to construct and manage a neighbor cell list for an access point (e.g., a femtocell, a picocell or a macrocell). In a sample implementation, the neighbor cell list (NCL) consists of primary scrambling codes (PSC) of neighbor access points that are operating in a frequency allocated to the operator (e.g., intra-frequency, inter-frequency and inter-RAT). The disclosure relates in some aspects to enabling an access point to self-construct and correctly manage an NCL to facilitate active and idle mobility and interference management.

In the example of FIG. 1, the access point 106 includes NCL management functionality 116 for maintaining an NCL 118 for the access point 106. The access point 106 broadcasts the physical layer identifiers of the NCL 118 so that access terminals (e.g., access terminals 102 and 104) in the vicinity of the access point 106 may each maintain a record of the NCL (e.g., the NCLs 124 and 126, respectively) for handover, reselection, or other purposes.

To maintain the NCL 118, the access point 106 transmits provisioning messages to access terminals (e.g., access terminal 102) being served by the access point 106. The provisioning messages instruct the access terminals to conduct intra-frequency, inter-frequency, or inter-RAT measurements. For example, the access terminals may detect messages from nearby access points (e.g., the neighbor access points 108-112), derive physical layer identifier information from these signals, and report back the results of the measurements (e.g., via measurement report messages (MRMs)) to the access point 106. In some cases, the access terminals decode system information (system info.) broadcast by a given neighbor access point, where the system information includes the NCL for that neighbor access point. In other cases, the access terminals detect the physical layer identifier (PLI) broadcast by the neighbor access point.

In some embodiments, the access point 106 includes functionality to maintain the NCL 118 based on network listen operations. For example, the access point 106 may include a network listen module (NLM) 128 that receives signals from nearby access points (e.g., the neighbor access points 108-112). In this way, the access point 106 may directly acquire the PLIs or NCLs of these access points.

In some embodiments, the access point 106 includes functionality to maintain the NCL 118 based on co-located cell information 130. For example, the access point 106 may maintain the co-located cell information 130 in a memory component and use this information to determine whether to include the physical layer identifier of co-located cells in the NCL 118.

In some embodiments, the NCL management functionality 116 maintains the NCL 118 based on registrations that occur when access terminals reselect to the access point 106. For example, in conjunction with such reselection, an access terminal (e.g., the access terminal 104) may send a registration message to the access point 106, where the registration message includes one or more physical layer identifiers detected by the access terminal. The NCL management functionality 116 may thus add these physical layer identifiers to the NCL 118.

In some embodiments, the NCL management functionality 116 cooperates with NCL management functionality 120 of the network entity 114 to acquire physical layer identifier information maintained by the NCL management functionality 120. For example, in some embodiments, the NCL management functionality 116 sends an identifier (e.g., GPS coordinates, a PSC, etc.) associated with the access point 106 to the NCL management functionality 120. Based on this identifier, the NCL management functionality 120 identifies any access points (e.g., identifies the cells of the access points) that are in a neighborhood associated with the access point 106 (e.g. within a defined geographical area, within a defined distance, within a location area, within a routing area, within a defined number of network hops, etc.). The NCL management functionality 120 then sends any physical layer identifiers associated with the identified access points (e.g., physical layer identifiers and/or NCLs of the access points) to the NCL management functionality 116. In this way, physical layer identifier information maintained by the network may be added to the NCL 118.

In some embodiments, the NCL management functionality 120 of the network entity 114 maintains an NCL 122 on behalf of the access point 106. For example, rather than have the access point 106 process received physical layer identifier information, the access point 106 may forward this information to the network entity 114. The NCL management functionality 120 may thus generate the NCL 122 based on this information and send the resulting NCL to the access point 106.

Sample operations of the system 100 will now be described in more detail in conjunction with the flowchart of FIG. 2.

Blocks 202 and 204 relate to acquiring physical layer identifiers from intra-frequency measurements. As represented by block 202, one or more messages requesting intra-frequency measurements are sent to one or more access terminals being served by an access point. As represented by block 204, intra-frequency measurement reports are received as a result of sending the message(s) of block 202.

Blocks 206-214 relate to acquiring physical layer identifiers from inter-frequency and/or inter-RAT measurements. As discussed above, this scheme involves cycling through different subsets of physical layer identifiers (e.g., 32 PSCs each) to eventually determine which physical layer identifiers of a superset (e.g., all 512 PSCs defined for a network, or a subset of these PSCs) to include in the NCL.

As represented by block 206, the physical layer identifier superset is partitioned into subsets for the inter-frequency and/or inter-RAT measurements. The partitioning may be accomplished in various ways. In some embodiments, the subsets are defined in a simple order (e.g., 1-32, 33-64, etc.).

In some embodiments, the physical layer identifiers are prioritized (e.g., as discussed below) and the subsets defined based on this prioritization. For example, the physical layer identifiers with the highest priority may be included in the subsets that are sent to the access terminal first. As another example, one or more physical layer identifiers of high priority may be included in more than one (e.g., all) of the subsets. In this way, the corresponding cells will be measured more frequently (e.g., to ensure that the cells are available for handover of an access terminal).

In some embodiments, the physical layer identifiers within a given subset are prioritized. In this way, the highest priority cells will be measured first. For example, the physical layer identifiers having the highest priority may comprise the first members of the subset (e.g., positions 1, 2, 3, etc.). In such a case, the access terminal may be configured to measure the first members of the subset first. As another example, an indication of the priority may be sent with the subset to the access terminals that will conduct the measurements. In this case, the access terminals may be configured to conduct measurements in the order specified by the priority indication.

Blocks 208-214 involve cycling through the subsets one at a time. In this way, all of the physical layer identifiers of the superset will be checked in turn to determine whether they should be included in the NCL.

As represented by block 208, one of the subsets is selected. For example, as discussed above, the subsets may be selected in a defined order.

As represented by block 210, a message requesting a measurement for the subset is sent to one or more access terminals. This message will typically include the subset (i.e., include all of the physical layer identifiers of the subset). As discussed herein, in some cases, such message may request inter-frequency measurements. Accordingly, the message also may specify the frequencies to be measured. In addition, in some cases, such message may request inter-RAT measurements. Thus, the message also may specify the RAT to be used for the measurement.

As represented by block 212, measurement reports are received as a result of the message(s) sent at block 210. As represented by block 214, the operations of blocks 208-212 are repeated for each successive subset until all of the subsets have been checked.

As represented by block 216, physical layer identifiers may be obtained via one or more other sources in various embodiments. For example, as discussed above, physical layer identifiers may be obtained via a network listen module, through the use of co-located cell information, via registration messages, via a network entity, and so on.

As represented by block 218, the NCL is updated based on all of the information obtained via the operations of the previous blocks. That is, the NCL may be updated based on one or more of: intra-frequency measurements, inter-frequency measurements, inter-RAT measurements, network listen module measurements, registration information, co-located cell information, network entity information, and so on.

Figure 2:
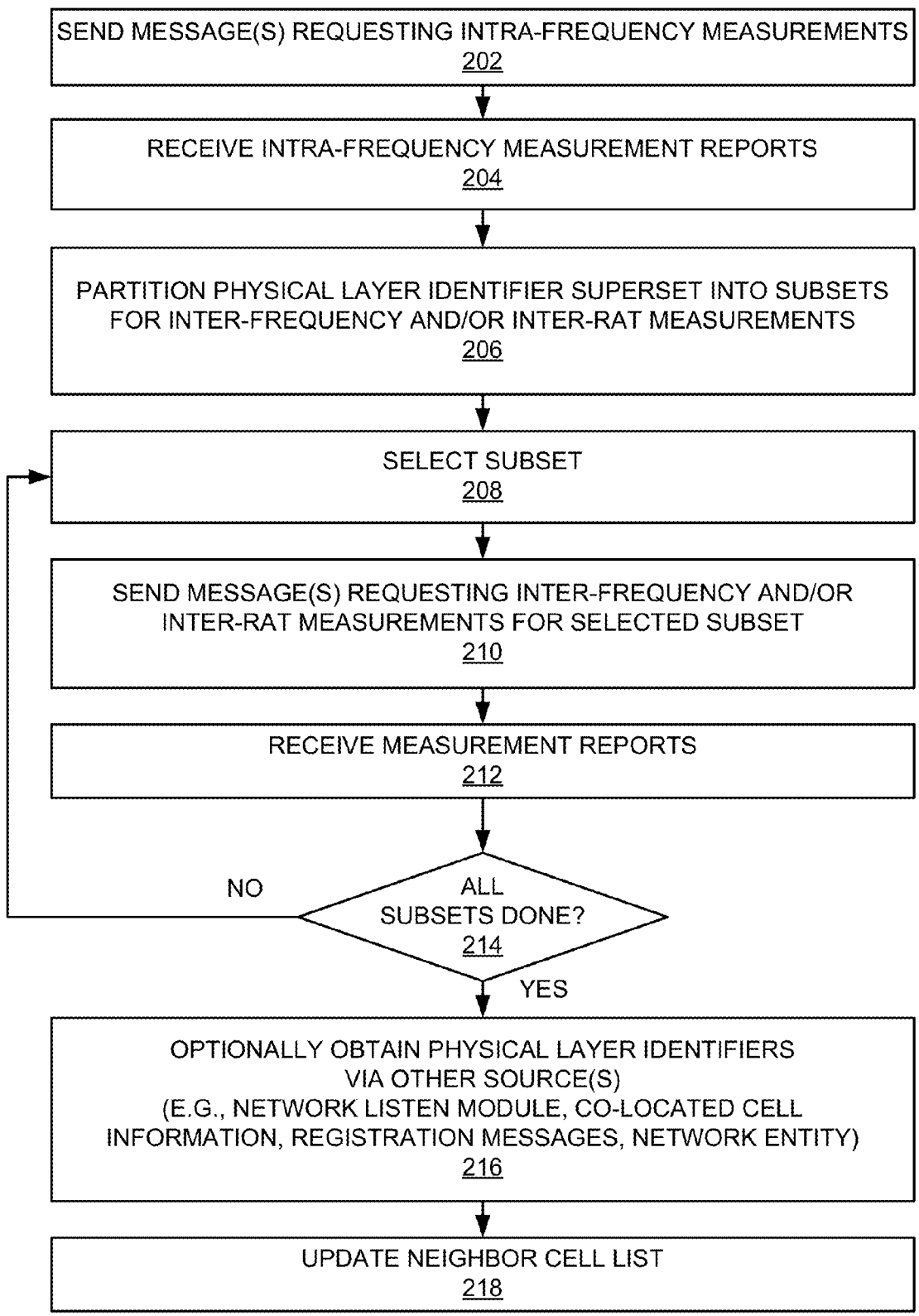
FIG. 2 is a flowchart of several sample aspects of operations that may be performed to maintain an NCL.

The operations of FIG. 2 may be performed by different entities in different embodiments. In some embodiments, these operations are performed by an access point for which the NCL is being maintained. In this case, the access point generates messages and sends the messages to the appropriate destination (e.g., by transmitting messages to access terminals being served by the access point or by sending message to a network entity). In addition, the access point will process any received messages (e.g., from access terminals or a network entity) to maintain the NCL.

In other embodiments, the operations of FIG. 2 are performed by a network entity that maintains the NCL for an access point and sends the updated NCL to the access point. In this case, the network entity generates messages and sends the messages to the access point. The access point, in turn, forwards the messages or transmits messages based on the received messages to one or more access terminals being served by the access point. In addition, the access point forwards any received information (e.g., information from measurement report messages) to the network entity to enable the network entity to maintain the NCL based on this information.

With the above overview in mind, several examples of NCL maintenance will now be described in more detail. For purposes of illustration, this example is described in the context of a UMTS system. It should be appreciated, however, that the teachings herein may be employed in other types of wireless communication systems (e.g., GSM, LTE, cdma2000, etc.).

The disclosure relates in some aspect to the creation and management of NCLs. In the examples that follow, the creation of an NCL includes generating a set of candidate PSCs.

In some embodiments, NCL management methods involve limiting the size of the NCL. For example, the length of the candidate PSC set may be limited (e.g., some current standards restrict the size of an NCL to 32 or less). Thus, if an initially created PSC set is larger than the designated size (e.g., greater than 32 PSCs), the list is pruned.

The disclosure relates in some aspects to creating a temporary NCL with determined PSCs for transmitting to a mobile entity (e.g., a UE). This may include determining the PSCs for the temporary NCL so as to provide different versions of the temporary NCL, each comprising a different subset of PSCs smaller than a defined set of all available PSCs (i.e., the subset reference above); for example, cycling through 512 possible PSCs in subsets of 32 PSCs at a time. The method may further include transmitting the different versions of the temporary NCL to the mobile entity at respective different times to provoke detection by the mobile entity of all detectable neighbor cells using any one of the defined set of all available PSCs on a wireless frequency not used by the mobile entity for communication with the serving cell. In other words, transmitting the different NCL versions may be performed to enable the mobile station to detect inter-frequency cells. It should also be appreciated that such a scheme may be employed for intra-frequency measurements in some embodiments.

The disclosure relates in some aspects to ranking PSCs (or creating a preferred PSC set) within the NCL, for both intra-frequency cells and inter-frequency cells. For example, PSCs in the NCL may be ranked to indicate an order of preference of neighbor cells for use in mobile entity mobility management. Lower-ranked PSCs may be removed from the list to maintain the NCL within a defined membership threshold. Thus, the NCL will contain only the highest ranked PSCs.

In some aspects, a prioritization method may include scoring the PSCs based on a signal quality indicator for respective associated neighbor cells. In the alternative, or in addition, prioritizing the PSCs may include scoring the PSCs based on registrations of idle mobile entities. For example, a score may be assigned in proportion to a cumulative count of registrations. In the alternative, or in addition, prioritizing the PSCs may include scoring the PSCs based on information from events generated during handovers to neighbor cells. Such handover events may indicate activity of a neighbor cell, relative to a given cell, and thus may be useful for scoring. In the alternative, or in addition, prioritizing the PSCs may include scoring the PSCs based on how frequently each PSC is reported in Measurement Report Messages (MRMs) received from one or more mobile entities in a coverage area of the cell. The various alternatives may be selected based on what information is readily available at the time the scoring is performed.

As discussed herein, for both active and idle mobility management, it is important to provide the correct set of PSCs to a UE for measurement. Based on the measurements or measurement report messages (MRMs), the UE or femtocell may take appropriate action as discussed herein. By providing an accurate list of PSCs to the UE in this manner, handover delays may be reduced. Thus, in some aspects, NCL management as taught herein may employ methods of ranking cells and/or creating a preferred list of PSCs that may be used for mobility management of idle or active UEs and/or for interference management.

To construct an accurate NCL at the femtocell (e.g., under RF blocking conditions), the following methods may be used. The NCL may be constructed using one or both of the described the methods, or some combination of the methods. The specific methods described are provided by way of example only, and should not be understood as limiting the novel features described herein to the specific examples described. The methods may be performed by a femtocell or other base station in cooperation with one or more mobile entities within radio range. In the alternative, or in addition, some features may be implemented at other network entities to support or perform certain aspects of the methods. As used herein, the term "intra-frequency" refers to neighbor frequencies that are the same as used by the femtocell of interest, assumed to be in the same RAT as used by the femtocell. The term "intra-frequency" refers to neighbor frequencies that are not the same as the frequency used by the femtocell, which may include inter-RAT frequencies unless the context clearly would exclude such a possibility. The term "Inter-RAT" refers to neighbor RATs that are not the same as the RAT used by the femtocell of interest.

Method 1

This method makes use of measurement report messages collected at the femtocell from a UE, and may be summarized as follows:

1. For constructing an intra-frequency NCL (e.g., a dedicated NCL or a portion of an NCL directed to intra-frequency cells), the femtocell provisions periodic or event-based reporting of detected cells. The reports are collected from UEs connected to the femtocell.

2. For constructing an inter-frequency NCL (e.g., a dedicated NCL or a portion of an NCL directed to inter-frequency cells), the femtocell provisions reporting of PSCs listed in the NCL. The PSCs listed in the NCL may be cycled to cover all possible PSCs (e.g., up to 512 PSCs; in some cases a range or ranges of PSCs may be known a priori to be unused). Thus, at a given time, the femtocell can provision reporting of up to 32 PSCs (or some other applicable limit). The algorithm described below specifies inter-frequency PSCs to measure during each cycle.

3. For constructing an intra-frequency and/or inter-frequency NCL, the femtocell also provisions reporting of cells on the random access channel (RACH). Any UE that registers to a femtocell reports the PSCs that the UE has measured, along with the corresponding signal measurements.

4. The femtocell NCL is constructed and updated based on information collected in steps 1, 2, and 3 above. For example, the NCL may be based on an aggregation of the intra-frequency detected cells, intra-frequency MRMs, inter-frequency MRMs, and UE registrations on RACH (e.g., RACH signaling in association with a registration event).

To reduce the impact the learning phase may have on mobility management, the following optimization may be used: based on a priori information (e.g., provided by an NLM, a Home NodeB management system (HMS), or some other entity), a few PSCs may be ranked higher during the learning phase and, for example, may always be included in the candidate list provided to the UE. For example, the first six PSCs in the NCL may be provided by the NLM or HMS, while the other PSCs may be rotated to obtain MRMs. A step similar to step 2 of Method 1 above can additionally be used for constructing an inter-RAT NCL (e.g., for GSM neighbor cells). Step 4 above may be used for inter-RAT NCL construction.

Method 2:

This method is based on the NLM and measurement report messages collected at the femtocell from UEs.

1. The femtocell employs a network listen module (NLM) to decode system information from the surrounding node Bs. The network listen module (NLM) is a subsystem of the femtocell that has mobile-like receiver capabilities.

a: If macrocells are detected (e.g., CPICH Ecp/Io>detection threshold, even if not high enough to decode broadcast channels), the detected PSC (intra and inter) information on each frequency can be used to construct NCL.

b: If macrocells are detected and their broadcast channels can be decoded, the NLM information is collected from all detected macrocells on all frequencies available to the operator.

2. In addition, the femtocell may also rely on measurement report messages from active femtocell users; and measurement report messages on the random access channel from allowed and restricted access users (as specified in Method 1).

3. The femtocell NCL is constructed and updated based on information collected in steps 1 and 2. For example, the NCL may be based on aggregation of NLM information, intra-frequency detected cells, intra-frequency MRMs, inter-frequency MRMs, and UE registrations on RACH.

Information obtained from different NLM measurements (over time) may be combined. Steps similar to 1, 2, and 3 of Method 2 may also be used to collect and construct inter-RAT NCLs (e.g., for GSM neighbor cells).

As noted, Method 2 relies on the network listen module and measurement report messages collected at the femtocell from UEs. As a further example, this method may include a procedure as follows. If no macrocells are detected at the femtocell, then the operator may use the femtocell's GPS coordinates to provision the NCL to the femtocell, and/or other steps described in method 1 may be employed.

Conversely, if macrocells are detected (e.g., CPICH Ec/Io>detection threshold) at the femtocell but their broadcast channels cannot be decoded (e.g., CPICH Ec/Io<decode threshold), then for each frequency i:

$NCL_{intra\text{-}frequency}$={list of cells detected}
$NCL_{inter\text{-}frequency,i}$={list of cells detected}

Assuming that the network listen module (NLM) decodes system information from the surrounding node Bs. Then SIB 11 information is collected from the cells on all frequencies available to the operator. $NCL_{intra\text{-}frequency}$ designates the union of: all PSCs listed in the intra-frequency NCL of cells detected in the femtocell frequency; and inter-frequency NCL, corresponding to femtocell frequency, of cells detected in the non-femtocell frequency. For each non-femtocell frequency i, $NCL_{inter\text{-}frequency,i}$ designates the union of: all PSCs listed in the intra-frequency NCL of cells detected in frequency i; and inter-frequency NCL, corresponding to the frequency i, of cells detected in other frequencies ($\neq$i).

For example, if the PSCs detected at NLM for frequencies A, B and C are 100, 101, and 102 respectively. Then: $NCL_A$=Union of PSCs {Intra_NCL_100, Inter_NCL_101 (corresponding to freq A), Inter_NCL_102 (corresponding to freq B)}; $NCL_B$=Union of PSCs {Inter_NCL_100 (corresponding to freq B), Intra_NCL_101, Inter_NCL_102 (corresponding to freq B)}; and $NCL_C$=Union of PSCs {Inter_NCL_100 (corresponding to freq C), Inter_NCL_101 (corresponding to freq C), Intra_NCL_102}.

In addition, the femtocell may also rely on measurement report messages from active femtocell users; and measurement report messages on the random access channel from allowed and restricted access users. A femtocell NCL may be constructed based on information collected in the above steps including one or more of: NLM information, intra-frequency detected cells, intra-frequency MRMs, inter-frequency MRMs, or UE registrations on RACH. Construction of inter-RAT NCL (e.g., for GSM neighbors) may follow a method similar to above for $NCL_{inter\text{-}frequency,i}$, with PSC replaced by the appropriate physical layer identifiers (e.g., broadcast control channel (BCCH) absolute radio-frequency channel numbers (ARFCN)).

The above methods may be used in conjunction with a femtocell reporting its GPS coordinates, IP address, PSCs, Cell ID of nearby cells (if available) to a Home NodeB Management System (HMS). The HMS may then: (a) identify PSCs (or RAT-specific physical identifiers) and cell IDs of all cells that are located in the neighborhood of the femtocell (based on their GPS coordinates); and/or (b) identify a few close-by macrocells/picocells and use their NCL information. The information obtained by the foregoing operations at the management entity may be used to construct the femtocell's NCL.

As a specific example, a femtocell may receive PSCs for the NCL from a network entity based on geographic location information for the femtocell. This geographic location may be obtained in any suitable fashion, such as using a GPS receiver or other locating technique. The network entity may determine likely neighbors from the geographic location information, obtain PSCs for the likely neighbors, and transmit them to the femtocell for populating an NCL.

To reduce the impact the learning phase may have on mobility management, the optimization described above for Method 1 also may be employed here. In view of the above, it should be appreciated that the foregoing methods may be used by femtocells to correctly configure their NCLs, while addressing some or all of the issues mentioned in the preceding sections. Advantageously, the techniques described herein are compatible with legacy UEs.

In conjunction with constructing an NCL, methods to manage (e.g., prioritize) an NCL may be employed at the femtocell in accordance with the teachings herein. For example, a preferred PSC list may be constructed at the femtocell that can be used for mobility management procedures. The methods may either reside at the femtocell or at the operator. Prioritization of an NCL may include using one of the methods described herein to create a potential list of NCL PSCs. Then, the femtocell provisions intra-frequency and inter-frequency reporting (periodic or event based) for the PSCs obtained. The femtocell then creates a score for the PSCs based on, for example, one or more of: (a) path loss (PL), CPICH Ec/Io, or CPICH RSCP; (b) idle registrations; (c) information from events generated during handovers (e.g., event 2d, event 2b, event 1a, etc); or (d) the frequency with which a PSC (or, in general, a neighbor cell) is observed in MRMs.

To obtain Cell Identifier (ID) information for intra-frequency and inter-frequency PSCs (and inter-RAT neighbor cells) acquired by the femtocell, the following approaches may be feasible. In a first approach, the HMS may provision a list of all PSCs or neighbor physical level identifiers and corresponding cell IDs and other necessary information in the neighborhood of the femtocell to the femtocell. The femtocell may then construct the NCL using that information. In the alternative, the PSCs or neighbor physical layer identifiers identified by the femtocell may be communicated to the HMS. In response, the HMS may provide the Cell ID and other information needed for the NCL to the femtocell.

As used herein, the term HMS is used in a generic sense, to encompass any one of a Home NodeB (HNB) Management System (as used by, e.g., Femto Forum or 3GPP); and any management/reference entity including, for example, an internal femtocell (e.g., HNB) database, possibly preconfigured, a location management database (e.g., GPS assistance) possibly adapted to provide neighbor cell information, or nearby femtocells/RNCs, with which the femtocell may exchange information (e.g., using 3G-ANR procedures or any other suitable procedures).

Information needed for the NCL may come in the form of reselection parameters, active mobility parameters, blocking indicators, RAN and Core Network identifiers and parameters.

Macrocell base stations in different frequencies are sometimes co-located (i.e., located at substantially the same physical location). To accommodate co-located macrocells, the present methods may be adapted as follows. If co-located macrocells operating in different frequencies have same PSCs, then the NCL_(PSC,interfreq) may contain PSCs in the NCL_(PSC,intrafreq). This is because detected cells can be reported for intra-frequency cells. If co-located macrocell information is available at the HNB, then the PSCs provided in the temporary NCL (e.g., intra and inter NCL) to the UE may be obtained from intra-frequency detected cell MRMs.

As discussed herein, the disclosure relates in some aspects to creating a temporary NCL and cycling to cover all 512 PSCs. An algorithm to cycle through all 512 PSCs will now be described.

The algorithm involves creating a temporary neighbor cell list, communicating the NCL to UEs, collecting measurement report messages from UEs and constructing a more accurate neighbor cell list. The method may rely on both active and idle mode UEs. If a UE is in idle mode, the femtocell may transition the UE into connected mode to collect reports.

To construct a temporary NCL list, the following approach may be employed:

i) Both the intra-frequency NCL and the inter-frequency NCL may cycle through all 512 PSCs in a sequential or random fashion. As discussed above, in some embodiments, it is not necessary to cycle through all PSCs in intra-frequency since intra-frequency measurements may have all detected cells reported. Hence, the intra-frequency NCL may contain a fixed list of PSCs.

ii) A better estimate of PSCs, to be populated in inter-frequency NCL, may be obtained by using information from intra-frequency MRMs. Since detected cell reporting is possible for intra-frequency cells, the PSCs detected can be populated in the next batch of inter-frequency PSCs sent to the UE (e.g., through the NCL, a cell info list, or a MCM). This approach may rely on information on co-located macrocells in other frequencies.

The above steps provide guidelines on creating the next batch of PSCs to be populated in NCL. The next batch of PSCs to be measured and reported by the UE is populated in the NCL. This list is communicated to the UE through one or more of: SIB 11, SIB 11bis, other broadcasts of intra-RAT and inter-RAT cells, a cell information list, or a MCM. The MCM is configured so that:

1. For constructing an intra-frequency NCL, the femtocell provisions periodic or event based reporting of detected cells.

2. For constructing an inter-frequency NCL, the femtocell provisions periodic or event based reporting of PSCs listed in the NCL.

3. For constructing an intra-frequency NCL and/or an inter-frequency NCL, the femtocell provisions reporting of cells on RACH. Any UE that registers to a femtocell, reports PSCs and their signal measurements.

The femtocell NCL is constructed based on information collected in steps 1, 2, and 3. That is, the NCL is based on: intra-frequency measured and detected cells, inter-frequency measured cells, and UE registrations (e.g., MRMs on RACH). Construction of the inter-RAT NCL (e.g., for GSM neighbors) can follow steps similar to 2 and 3 above.

Additional details relating to maintaining (e.g., creating, defining, managing, etc.) an NCL will now be described in conjunction with the flowcharts of FIGS. 3-9. For convenience, the operations of FIGS. 3-9 (or any other operations discussed or taught herein) may be described as being performed by specific components (e.g., components of FIG. 1 or 10). For example, in some embodiments, most of the operations of FIGS. 3-9 may be performed by a femtocell for which the NCL is being maintained. In other embodiments, however, many of the operations of FIGS. 3-9 may be performed by a network entity that maintains the NCL for the femtocell and sends the updated NCL to the femtocell. It should be appreciated, however, that these operations may be performed by other types of components and may be performed using a different number of components. It also should be appreciated that one or more of the operations described herein may not be employed in a given implementation.

For purposes of illustration, the following discussion may refer to physical layer identifiers of a cell of an access point. It should be appreciated that a given access point may comprise a single physical cell or multiple physical cells. Also, depending on the context, in some cases the term cell refers to a coverage area of a physical cell.

Figure 3:
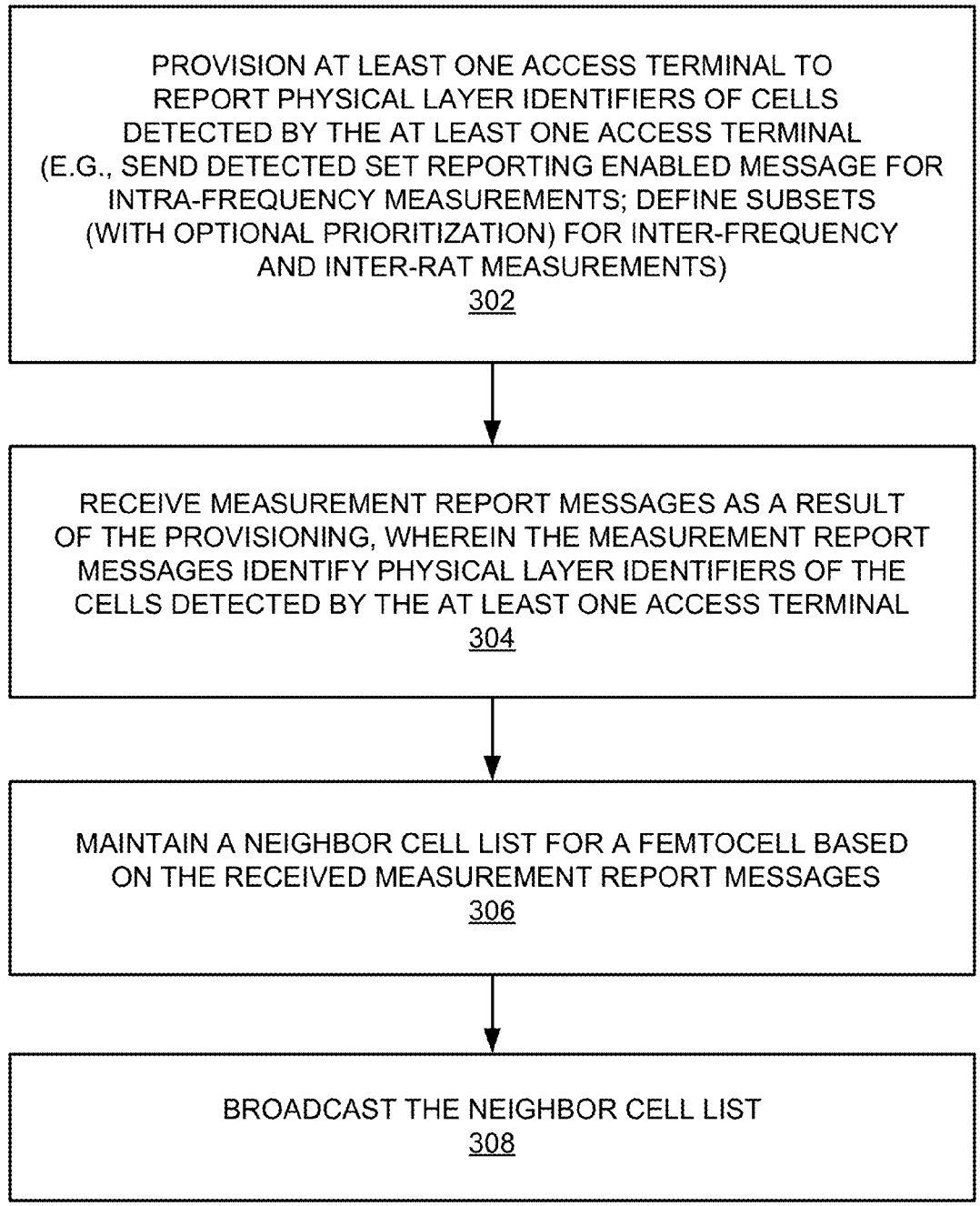
FIG. 3 is a flowchart of several sample aspects of operations that may be performed in conjunction with maintaining an NCL.

FIG. 3 describes several high-level operations that may be performed in conjunction with maintaining an NCL.

As represented by block 302, at least one access terminal is provisioned to report physical layer identifiers of cells detected by the access terminal(s). As discussed herein, this reporting may relate to one or more of: intra-frequency measurements, inter-frequency measurements, or inter-RAT measurements.

For example, in some embodiments, the provisioning comprises sending at least one message indicating that Detected Set reporting is enabled. As another example, in some embodiments, the provisioning comprises sending at least one message that requests the access terminal(s) to send measurement report messages. Here, the message(s) may specify a set of physical layer identifiers to be searched by the access terminal(s).

As yet another example, in some embodiments, the provisioning comprises: defining different subsets of a superset of physical layer identifiers; and successively transmitting the different subsets to the access terminal(s) to successively identify all cells of the superset that are detectable by the access terminal(s). In some cases, the definition of the different subsets comprises identifying at least one physical layer identifier that is included in each of the subsets.

In some cases, the definition of the different subsets comprises prioritizing the physical layer identifiers of the superset to select a different set of the physical layer identifiers for each of the subsets.

In some cases, the definition of the different subsets comprises, for each of the subsets, prioritizing the physical layer identifiers of the subset. Here, for each of the subsets, an indication of the prioritization of the physical layer identifiers may be transmitted with the subset.

In either of the two prioritization cases discussed above, the prioritization may be based on various criteria. For example, in some embodiments, the prioritization is based on at least one of: path losses associated with the physical layer identifiers (e.g., lower path losses result in higher priority or score); registrations of idle access terminals at cells associated with the physical layer identifiers (e.g., more registrations result in higher priority or score); information from events generated during handovers associated with the physical layer identifiers (e.g., more events result in higher priority or score); how frequently the physical layer identifiers are reported in the received measurement report messages (e.g., more reports result in higher priority or score); or signal quality (e.g., strength) associated with the physical layer identifiers (e.g., higher signal quality results in higher priority or score).

As represented by block 304 of FIG. 3, measurement report messages are received as a result of the provisioning. At a minimum, the measurement report messages identify (e.g., include) physical layer identifiers (e.g., PSCs) of the cells detected by the access terminal(s). Depending on the provisioning of block 302, these measurement report messages may correspond to one or more of: intra-frequency measurements, inter-frequency measurements, or inter-RAT measurements.

As represented by block 306, a neighbor cell list for the femtocell is maintained based on the received measurement report messages. For example, any physical layer identifiers that were reported by the measurement report messages but were not already in the NCL may be added to the NCL. Conversely, any physical layer identifiers that were in the NCL but were not reported by the measurement report messages may be removed from the NCL.

As represented by block 308, the current version of the NCL is broadcast by the femtocell. For example, the femtocell may broadcast the NCL via System Information Block (SIB) 11, or some other suitable messaging (e.g., a cell information list or a measurement control message (MCM)). It should be appreciated that the operations of blocks 302-308 will be performed on a repeated basis. Thus, any access terminal that receives the NCL may effectively rely on the NCL since the contents of the NCL are continually being updated and verified through multiple means as described herein.

FIGS. 4-9 describe sample operations that may be employed in conjunction with the operations of FIG. 3. As discussed below, in various deployment scenarios, the described operations may correspond to the operations of FIG. 3, may be performed in addition to the operations of FIG. 3, or may be performed independent of the operations of FIG. 3.

Figure 4:
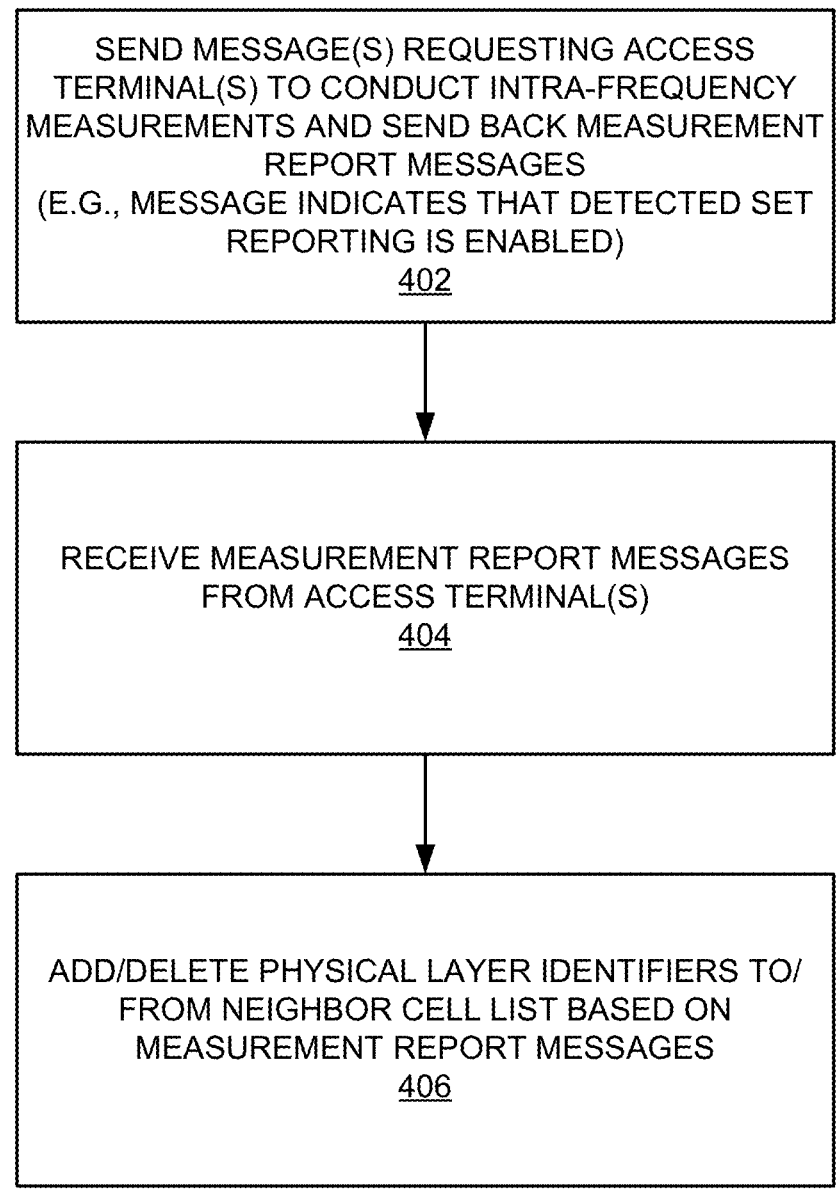
FIG. 4 is a flowchart of several sample aspects of operations that may be performed to maintain an NCL based on intra-frequency measurement reports.

FIG. 4 describes several operations relating to maintaining an NCL based on intra-frequency measurement reports. The operations of blocks 402, 404, and 406, may correspond to the operations of block 302, 304, and 306, respectively.

As represented by block 402, message(s) requesting access terminal(s) to conduct intra-frequency measurements and send back measurement report messages are sent (e.g., by a femtocell). As discussed herein, each message may indicate that Detected Set reporting is enabled. Consequently, the message need not specify which physical layer identifiers are to be searched for by the access terminal(s).

As represented by block 404, measurement report messages are received (e.g., at the femtocell) from one or more of the access terminal(s) to which a message was sent at block 402. These measurement report messages will include the physical layer identifiers of any cells detected by the access terminal(s). That is, these measurement reports need not be constrained by the current physical layer identifier listed in the femtocell's NCL.

As represented by block 406, physical layer identifiers may be added to or deleted from the NCL based on whether the physical layer identifiers are reported in the measurement report messages. For example, an identifier may be added if it was reported, and if the corresponding signal strength exceeds a threshold value, and if the identifier was not already in the NCL. Alternatively, an identifier may be removed if it was not reported. As discussed herein, the operations of blocks 402-406 are repeated over time to maintain an accurate NCL (e.g., for the femtocell).

Figure 5:
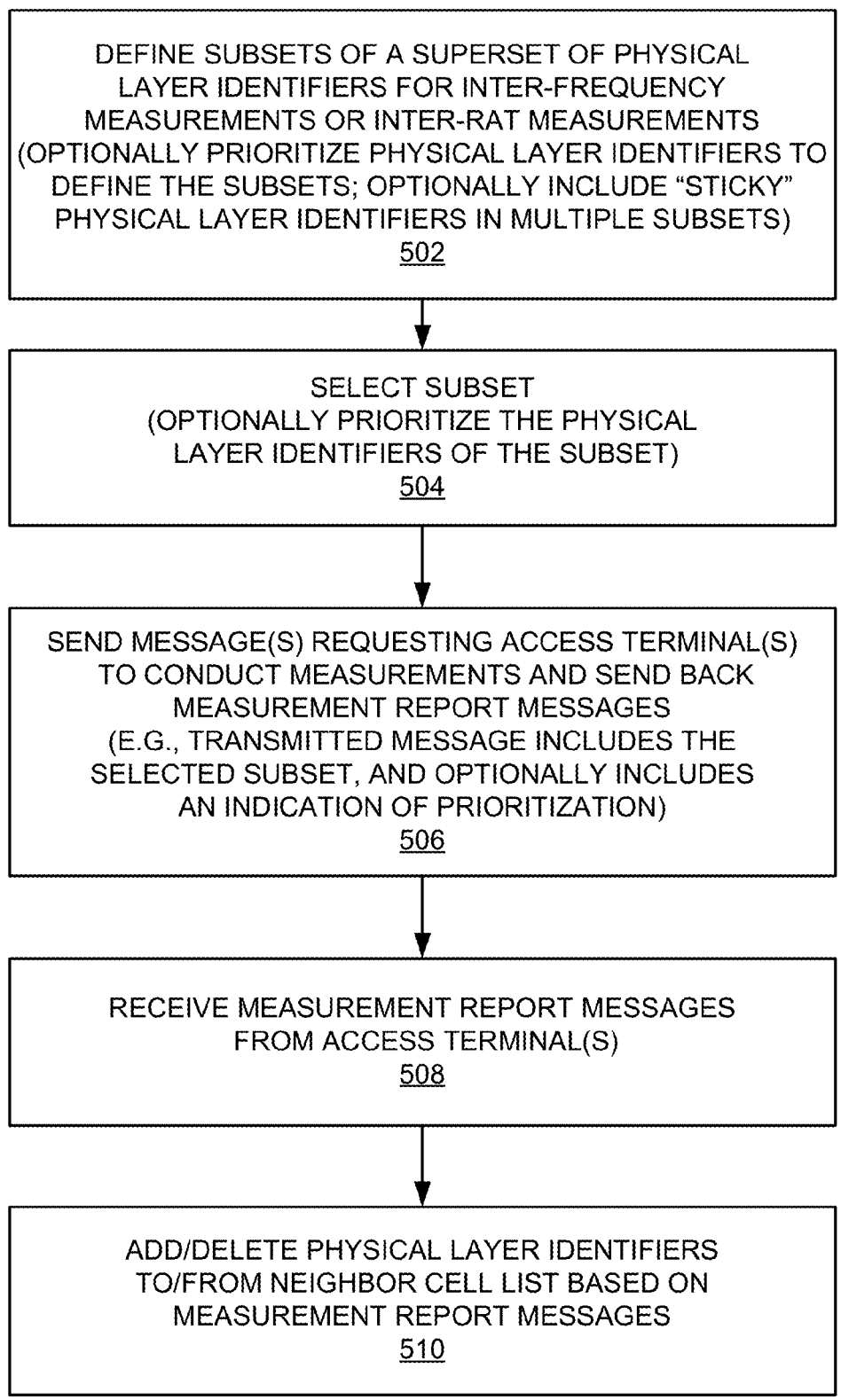
FIG. 5 is a flowchart of several sample aspects of operations that may be performed to maintain an NCL based on inter-frequency and/or inter-RAT measurement reports.

FIG. 5 describes several operations relating to maintaining an NCL based on inter-frequency and/or inter-RAT measurement reports. The operations of blocks 502-506 may correspond to the operations of block 302 of FIG. 3, while the operations of blocks 508 and 510 may correspond to the operations of blocks 304 and 306, respectively.

As represented by block 502, subsets of a superset of physical layer identifiers for inter-frequency measurements or inter-RAT measurements are defined. As discussed above, in some embodiments, the physical layer identifiers are prioritized to define the subsets. In addition, in some embodiments, "sticky" physical layer identifiers are included in multiple (e.g., all) subsets.

As represented by block 504, one of the subsets is selected. As discussed above, in some embodiments, the physical layer identifiers of the subset are prioritized.

As represented by block 506, message(s) requesting access terminal(s) to conduct inter-frequency and/or inter-RAT measurements and send back measurement report messages are sent (e.g., by the femtocell). Here, a transmitted message typically includes the selected subset, and optionally includes an indication of prioritization.

As represented by block 508, measurement report messages are received (e.g., at the femtocell) from one or more of the access terminal(s) to which a message was sent at block 506. Each measurement report message will list each physical layer identifier of the subset that was detected by an access terminal. In addition, each message will indicate the frequency and/or RAT on which the physical layer identifier was detected.

As represented by block 510, physical layer identifiers may be added to or deleted from the NCL based on whether the physical layer identifiers are reported in the measurement report messages. As discussed herein, the operations of blocks 504-510 are repeated over time to maintain an accurate NCL (e.g., for the femtocell).

Figure 6:
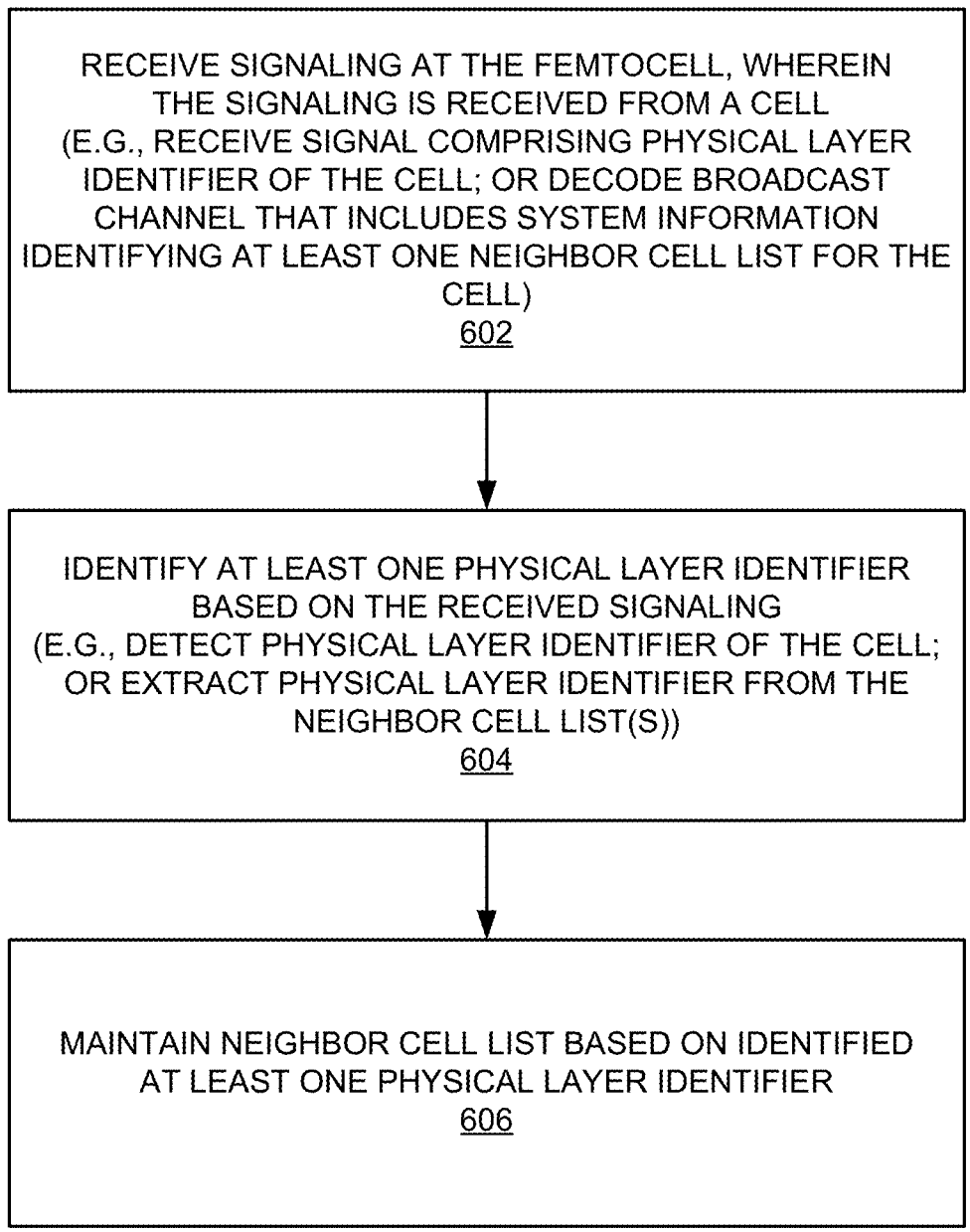
FIG. 6 is a flowchart of several sample aspects of operations that may be performed to maintain an NCL based on signaling from an access point.

FIG. 6 describes several operations relating to maintaining an NCL based on signaling from an access point. In some cases, blocks 602 and 604 represent operations that may be employed, for example, to supplement the operations of FIG. 3 (e.g., to provide an additional mechanism for identifying physical layer identifiers of nearby cells). In other cases, however, the operations of FIG. 6 may be deployed independently.

As represented by block 602, signaling from a cell is received at a femtocell. For example, the femtocell may receive a signal comprising a physical layer identifier of the cell. As another example, the signaling may comprises a broadcast channel that includes system information identifying at least one neighbor cell list for the cell. In this case, the receipt of the signaling may comprise decoding the broadcast channel.

As represented by block 604, at least one physical layer identifier is identified based on the received signaling. In cases where the received signaling comprises a physical layer identifier of the cell, the identification of the at least one physical layer identifier may comprise detecting a physical layer identifier of the cell from the signaling. In cases where the received signaling comprised a broadcast channel that includes system information, the identification of the at least one physical layer identifier may comprise extracting physical layer identifiers from the neighbor cell list(s) included in the system information.

As represented by block 606, the NCL for the femtocell is then maintained based on the identified physical layer identifier(s). For example, a physical layer identifier may be added to the NCL if the corresponding signal strength exceeds a threshold value, and if the identifier was not already in the NCL.

Figure 7:
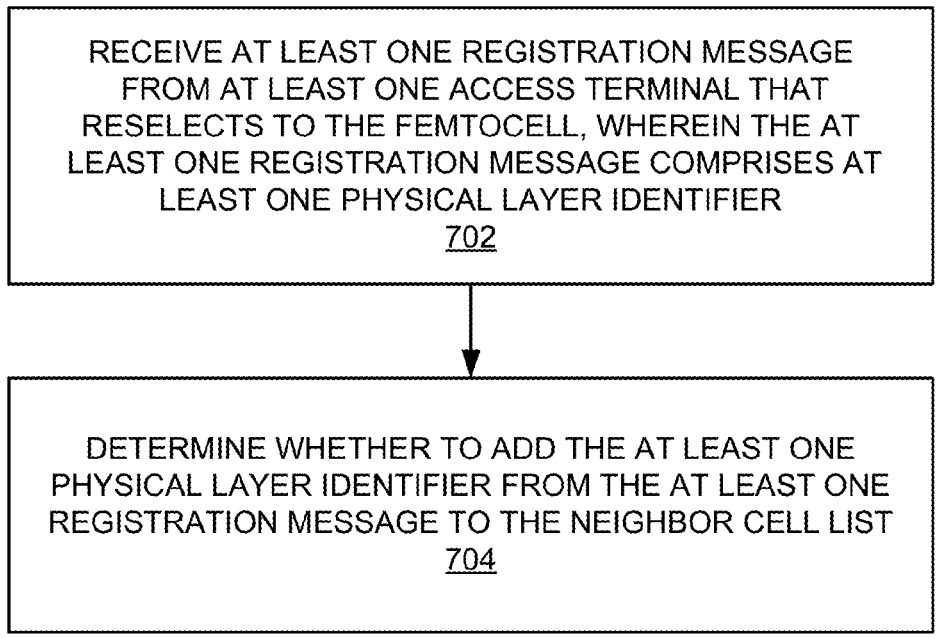
FIG. 7 is a flowchart of several sample aspects of operations that may be performed to maintain an NCL based on access terminal registration.

FIG. 7 describes several operations relating to maintaining an NCL based on access terminal registration.

As represented by block 702, at least one registration message from at least one access terminal that reselects to the femtocell is received. As discussed above, the registration message(s) may comprise (e.g., include) at least one physical layer identifier that was previously detected by the access terminal(s).

As represented by block 704, a determination is then made, based on the received information, whether to add the physical layer identifier(s) to the NCL. For example, a received physical layer identifier may be added to the NCL if the corresponding signal strength (indicated in the registration message) exceeds a threshold value, and if the physical layer identifier was not already in the NCL.

Figure 8:
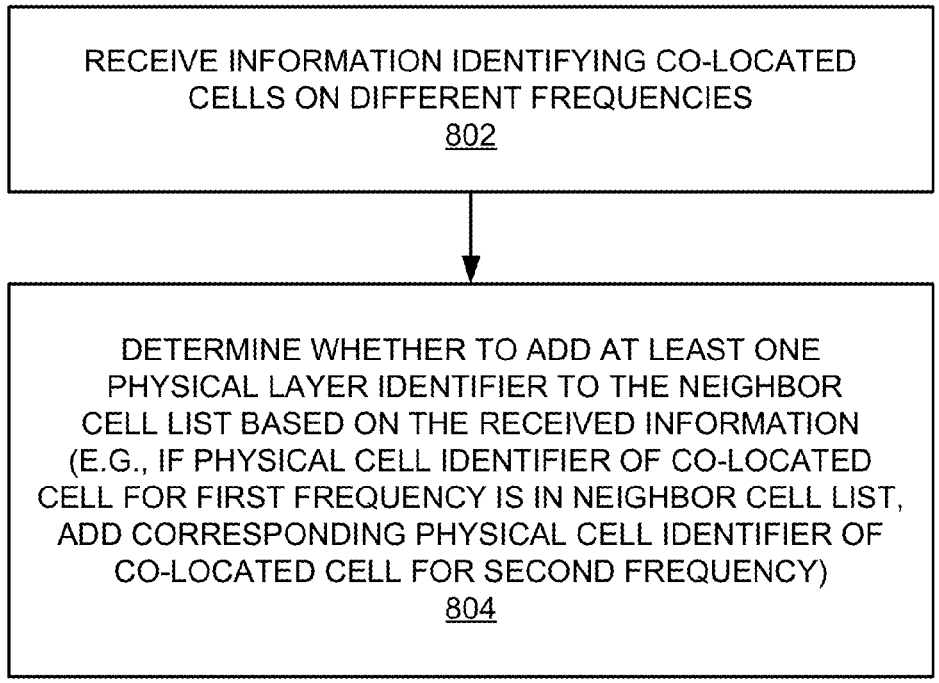
FIG. 8 is a flowchart of several sample aspects of operations that may be performed to maintain an NCL based on co-located cell information.

FIG. 8 describes several operations relating to maintaining an NCL based on co-located cell information.

As represented by block 802, information identifying co-located cells on different frequencies is received. For example, the information may identify the physical layer identifier used by the co-located cells and also indicate the frequencies on which these cells operate.

As represented by block 804, a determination is then made, based on the received information, whether to add the physical layer identifier to the NCL. For example, if a physical layer identifier of co-located cell for a first frequency has been detected (e.g., is currently in the NCL), the corresponding physical layer identifier (i.e., the same identifier) of the co-located cell for a second frequency is added to the NCL.

Figure 9:
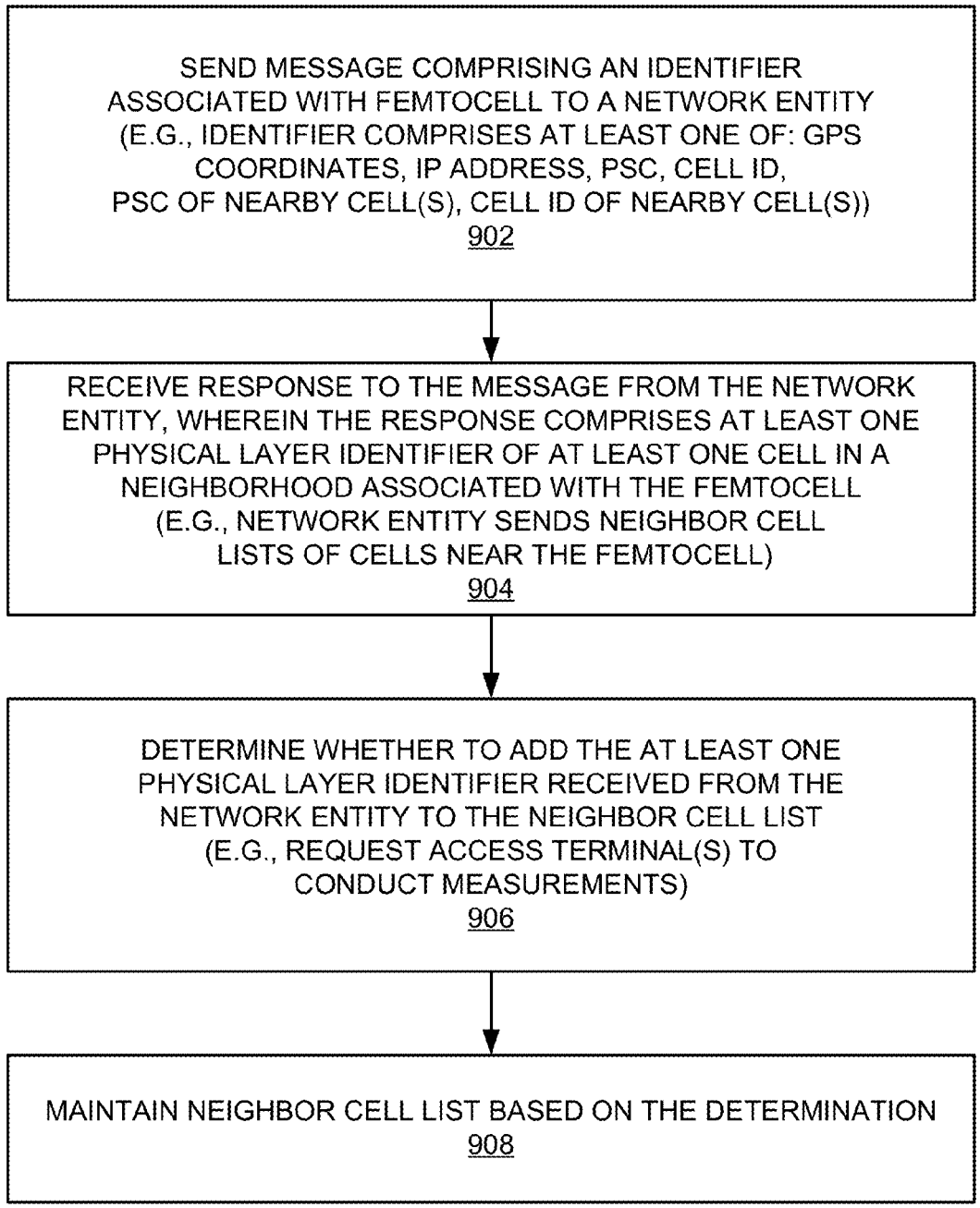
FIG. 9 is a flowchart of several sample aspects of operations that may be performed to maintain an NCL based on information from a network entity.

FIG. 9 describes several operations relating to maintaining an NCL based on information from a network entity.

As represented by block 902, a message comprising an identifier associated with the femtocell is sent to a network entity. This identifier may take different forms in different embodiments. For example, the identifier may comprise at least one of: GPS coordinates of the femtocell, the IP address of the femtocell, the physical layer identifier (e.g., PSC) of the femtocell, the cell ID of the femtocell, the physical layer identifiers (e.g., PSCs) of nearby cell(s), or the cell IDs of nearby cell(s).

Upon receiving this message, the network entity will identify any cells that are in a neighborhood associated with the femtocell. The network entity will then send a message (e.g., to the femtocell) including the physical layer identifiers (and optionally other information such as cell IDs) associated with the identified cells. For example, the network entity may send the physical layer identifiers of these cells and, in some cases, the NCLs of those cells.

Accordingly, as represented by block 904, a response to the message of block 902 is received from the network entity. As discussed above, the response may comprise at least one physical layer identifier of at least one cell in a neighborhood associated with the femtocell.

As represented by block 906, a determination is then made, based on the response, whether to add the physical layer identifier(s) received from the network entity to the NCL. Accordingly, as represented by block 908, the NCL for the femtocell may be maintained based on the determination of block 906.

Figure 10:
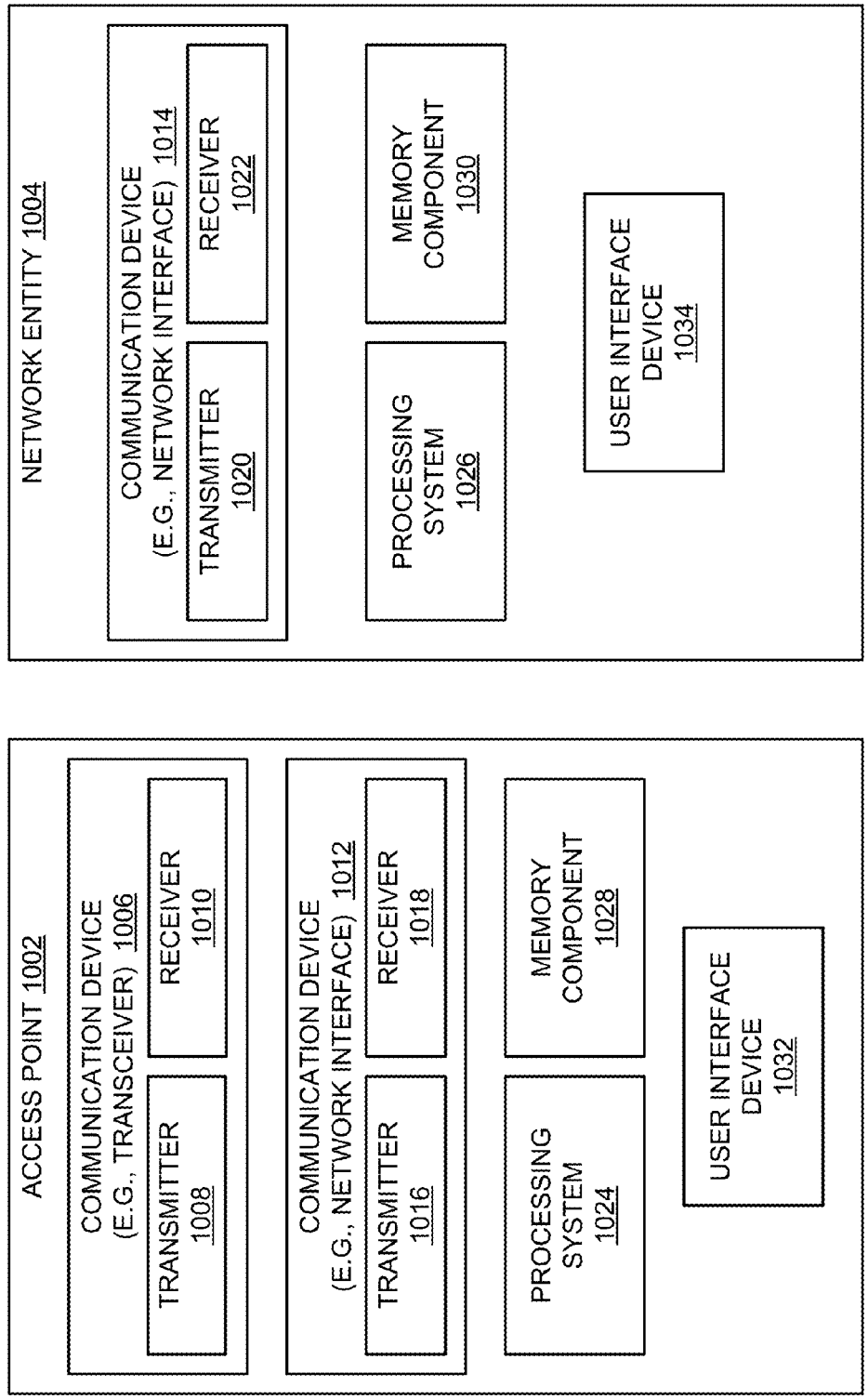
FIG. 10 is a simplified block diagram of several sample aspects of components that may be employed in communication nodes.

FIG. 10 illustrates several sample components (represented by corresponding blocks) that may be incorporated into nodes such as an access point 1002 and a network entity 1004 (e.g., corresponding to the access point 106 and the network entity 114 of FIG. 1, respectively) to perform NCL-related operations as taught herein. The described components also may be incorporated into other nodes in a communication system. For example, other nodes in a system may include components similar to those described for the access point 1002 to provide similar functionality. Also, a given node may contain one or more of the described components. For example, an access point may contain multiple transceiver components that enable the access point to operate on multiple carriers and/or communicate via different technologies.

As shown in FIG. 10, the access point 1002 includes one or more wireless communication devices 1006 (e.g., a transceiver) for communicating with other nodes (e.g., access terminals and/or access points) Each communication device 1006 includes a transmitter 1008 for sending signals (e.g., messages, information) and a receiver 1010 for receiving signals (e.g., messages, information). In some embodiments, a communication device 1006 (e.g., one of multiple wireless communication devices of the access point 1002) comprises a network listen module.

The access point 1002 and the network entity 1004 also include one or more communication devices 1012 and 1014 (e.g., a network interface), respectively, for communicating with other nodes (e.g., network entities). For example, a communication device 1012 or 1014 may be configured to communicate with one or more network entities via a wire-based or wireless backhaul. In some aspects, a communication device 1012 or 1014 may be implemented as a transceiver (e.g., including transmitter and receiver components) configured to support wire-based or wireless signal communication. This communication may involve, for example, sending and receiving: messages, parameters, other types of information, and so on. Accordingly, in the example of FIG. 10, the communication device 1012 is shown as including a transmitter 1016 and a receiver 1018, while the communication device 1014 is shown as including a transmitter 1020 and a receiver 1022.

The access point 1002 and the network entity 1004 also include other components that may be used in conjunction with NCL-related operations as taught herein. For example, the access point 1002 includes a processing system 1024 for providing functionality relating to maintaining an NCL and for providing other processing functionality. Similarly, the network entity 1004 includes a processing system 1026 for providing functionality relating to maintaining an NCL and for providing other processing functionality. The access point 1002 and the network entity 1004 each include a memory component 1028 and 1030 (e.g., including a memory device), respectively, for maintaining information (e.g., traffic information, thresholds, parameters, and so on). In addition, the access point 1002 and the network entity 1004 each include a user interface device 1032 and 1034, respectively, for providing indications (e.g., audible and/or visual indications) to a user and/or for receiving user input (e.g., upon user actuation of a sensing device such a keypad, a touch screen, a microphone, and so on).

For convenience the access point 1002 and the network entity 1004 are shown in FIG. 10 as including components that may be used in the various examples described herein. In practice, the illustrated blocks may have different functionality in different implementations. For example, in some implementations the functionality of the block 1024 may be different in an embodiment implemented in accordance with FIG. 4 as compared to an embodiment implemented in accordance with FIG. 5.

The components of FIG. 10 may be implemented in various ways. In some implementations the components of FIG. 10 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some of the functionality represented by blocks 1006 and 1012, and some or all of the functionality represented by blocks 1024, 1028, and 1032 may be implemented by a processor or processors of an access point and data memory of the access point (e.g., by execution of appropriate code and/or by appropriate configuration of processor components). Similarly, some of the functionality represented by block 1014, and some or all of the functionality represented by blocks 1026, 1030, and 1034 may be implemented by a processor or processors of a network entity and data memory of the network entity (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macrocell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macrocell, and so on. Also, a femto access point may be configured or referred to as a Home NodeB, Home eNodeB, access point base station, femtocell, and so on. In some implementations, a node may be associated with (e.g., referred to as or divided into) one or more cells or sectors. A cell or sector associated with a macro access point, a femto access point, or a pico access point may be referred to as a macrocell, a femtocell, or a picocell, respectively.

Figure 11:
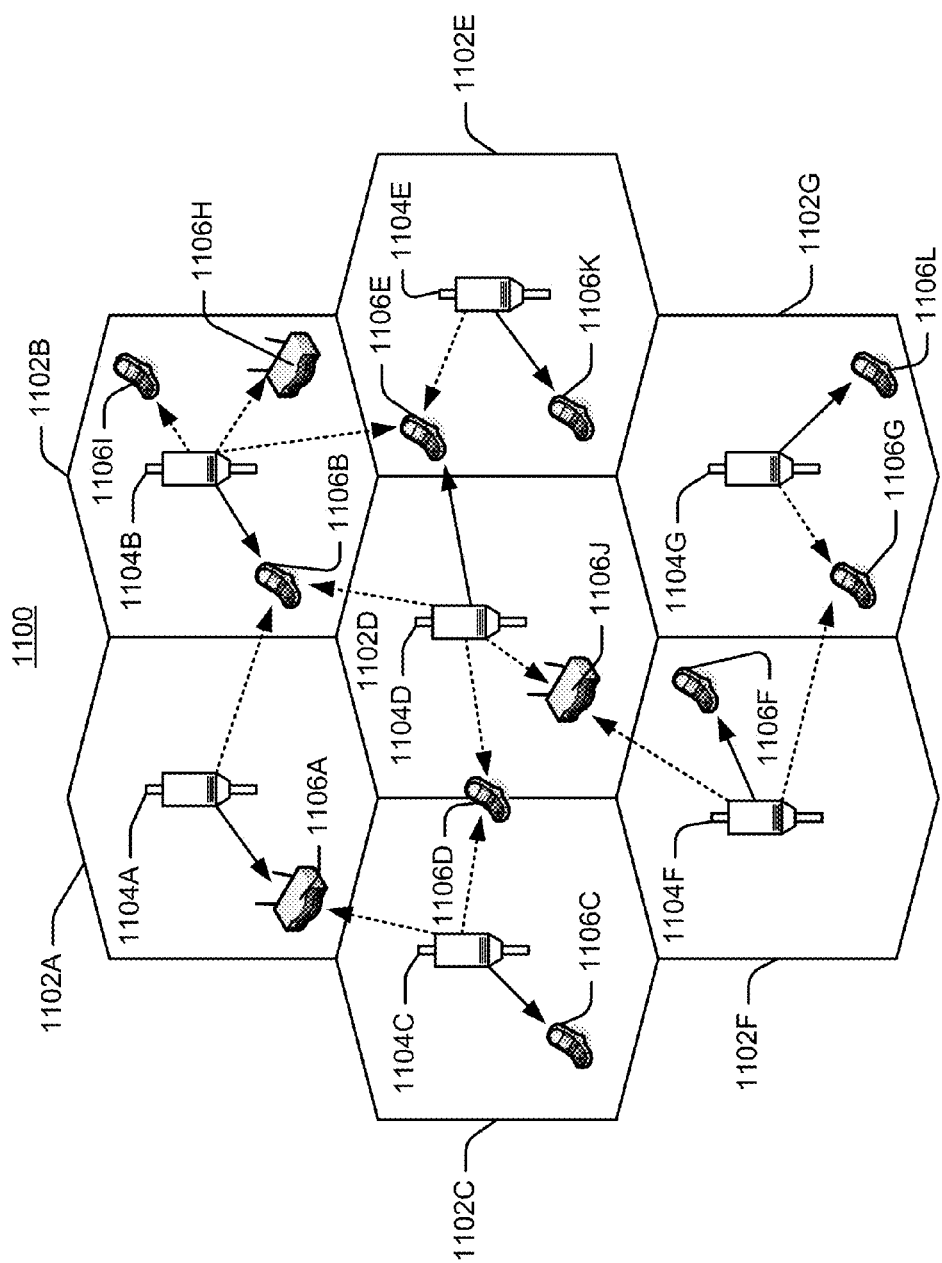
FIG. 11 is a simplified diagram of a wireless communication system.

FIG. 11 illustrates a wireless communication system 1100, configured to support a number of users, in which the teachings herein may be implemented. The system 1100 provides communication for multiple cells 1102, such as, for example, macrocells 1102A-1102G, with each cell being serviced by a corresponding access point 1104 (e.g., access points 1104A-1104G). As shown in FIG. 11, access terminals 1106 (e.g., access terminals 1106A-1106L) may be dispersed at various locations throughout the system over time. Each access terminal 1106 may communicate with one or more access points 1104 on a forward link (FL) and/or a reverse link (RL) at a given moment, depending upon whether the access terminal 1106 is active and whether it is in soft handoff, for example. The wireless communication system 1100 may provide service over a large geographic region. For example, macrocells 1102A-1102G may cover a few blocks in a neighborhood or several miles in a rural environment.

Figure 12:
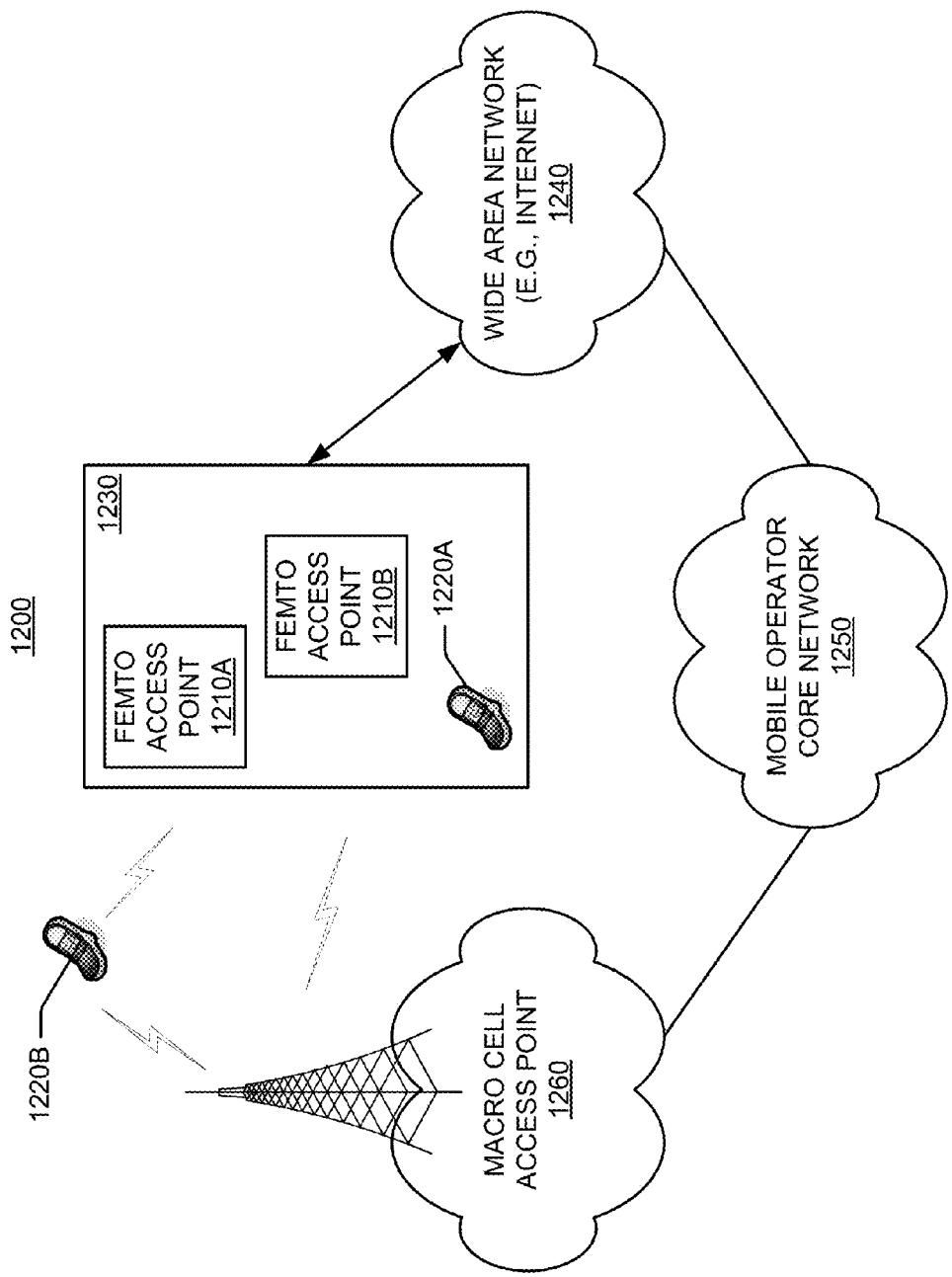
FIG. 12 is a simplified diagram of a wireless communication system including femto nodes.

FIG. 12 illustrates an exemplary communication system 1200 where one or more femto access points are deployed within a network environment. Specifically, the system 1200 includes multiple femto access points 1210 (e.g., femto access points 1210A and 1210B) installed in a relatively small scale network environment (e.g., in one or more user residences 1230). Each femto access point 1210 may be coupled to a wide area network 1240 (e.g., the Internet) and a mobile operator core network 1250 via a DSL router, a cable modem, a wireless link, or other connectivity means (not shown). As will be discussed below, each femto access point 1210 may be configured to serve associated access terminals 1220 (e.g., access terminal 1220A) and, optionally, other (e.g., hybrid or alien) access terminals 1220 (e.g., access terminal 1220B). In other words, access to femto access points 1210 may be restricted whereby a given access terminal 1220 may be served by a set of designated (e.g., home) femto access point(s) 1210 but may not be served by any non-designated femto access points 1210 (e.g., a neighbor's femto access point 1210).

Figure 13:
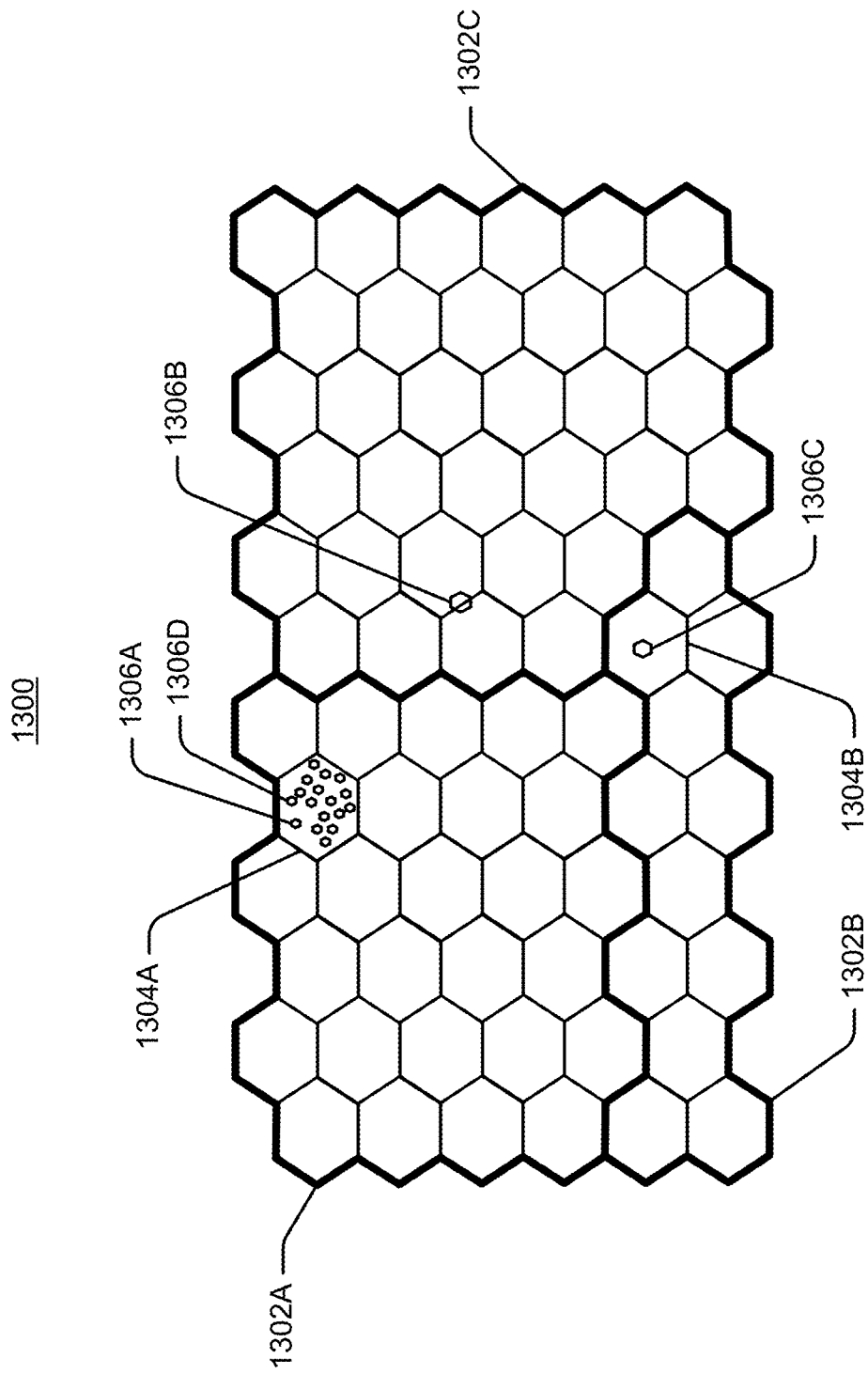
FIG. 13 is a simplified diagram illustrating coverage areas for wireless communication.

FIG. 13 illustrates an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 are represented by the larger hexagons. The tracking areas 1302 also include femto coverage areas 1306. In this example, each of the femto coverage areas 1306 (e.g., femto coverage areas 1306B and 1306C) is depicted within one or more macro coverage areas 1304 (e.g., macro coverage areas 1304A and 1304B). It should be appreciated, however, that some or all of a femto coverage area 1306 may not lie within a macro coverage area 1304. In practice, a large number of femto coverage areas 1306 (e.g., femto coverage areas 1306A and 1306D) may be defined within a given tracking area 1302 or macro coverage area 1304. Also, one or more pico coverage areas (not shown) may be defined within a given tracking area 1302 or macro coverage area 1304.

Referring again to FIG. 12, the owner of a femto access point 1210 may subscribe to mobile service, such as, for example, 3G mobile service, offered through the mobile operator core network 1250. In addition, an access terminal 1220 may be capable of operating both in macro environments and in smaller scale (e.g., residential) network environments. In other words, depending on the current location of the access terminal 1220, the access terminal 1220 may be served by a macrocell access point 1260 associated with the mobile operator core network 1250 or by any one of a set of femto access points 1210 (e.g., the femto access points 1210A and 1210B that reside within a corresponding user residence 1230). For example, when a subscriber is outside his home, he is served by a standard macro access point (e.g., access point 1260) and when the subscriber is at home, he is served by a femto access point (e.g., access point 1210A). Here, a femto access point 1210 may be backward compatible with legacy access terminals 1220.

A femto access point 1210 may be deployed on a single frequency or, in the alternative, on multiple frequencies. Depending on the particular configuration, the single frequency or one or more of the multiple frequencies may overlap with one or more frequencies used by a macro access point (e.g., access point 1260).

In some aspects, an access terminal 1220 may be configured to connect to a preferred femto access point (e.g., the home femto access point of the access terminal 1220) whenever such connectivity is possible. For example, whenever the access terminal 1220A is within the user's residence 1230, it may be desired that the access terminal 1220A communicate only with the home femto access point 1210A or 1210B.

In some aspects, if the access terminal 1220 operates within the macro cellular network but is not residing on its most preferred network (e.g., as defined in a preferred roaming list), the access terminal 1220 may continue to search for the most preferred network (e.g., the preferred femto access point 1210) using a better system reselection (BSR) procedure, which may involve a periodic scanning of available systems to determine whether better systems are currently available and subsequently acquire such preferred systems. The access terminal 1220 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1210, the access terminal 1220 selects the femto access point 1210 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macrocell mobile network and a defined set of femto access points (e.g., the femto access points 1210 that reside within the corresponding user residence 1230). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
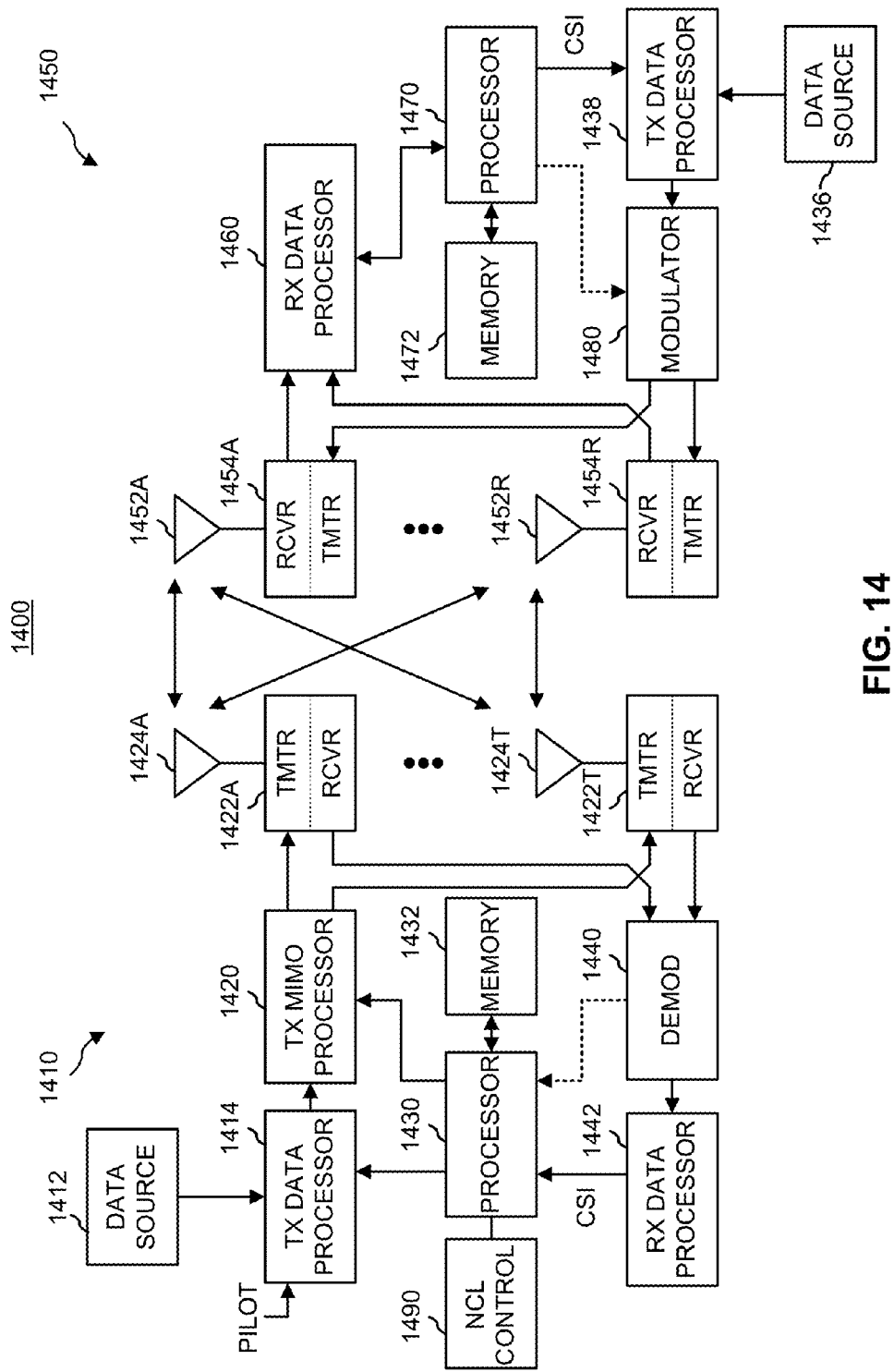
FIG. 14 is a simplified block diagram of several sample aspects of communication components.

FIG. 14 illustrates a wireless device 1410 (e.g., an access point) and a wireless device 1450 (e.g., an access terminal) of a sample MIMO system 1400. At the device 1410, traffic data for a number of data streams is provided from a data source 1412 to a transmit (TX) data processor 1414. Each data stream may then be transmitted over a respective transmit antenna.

The TX data processor 1414 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1430. A data memory 1432 may store program code, data, and other information used by the processor 1430 or other components of the device 1410.

The modulation symbols for all data streams are then provided to a TX MIMO processor 1420, which may further process the modulation symbols (e.g., for OFDM). The TX MIMO processor 1420 then provides $N_T$ modulation symbol streams to $N_T$ transceivers (XCVR) 1422A through 1422T. In some aspects, the TX MIMO processor 1420 applies beam-forming weights to the symbols of the data streams and to the antenna from which the symbol is being transmitted.

Each transceiver 1422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1422A through 1422T are then transmitted from $N_T$ antennas 1424A through 1424T, respectively.

At the device 1450, the transmitted modulated signals are received by $N_R$ antennas 1452A through 1452R and the received signal from each antenna 1452 is provided to a respective transceiver (XCVR) 1454A through 1454R. Each transceiver 1454 conditions (e.g., filters, amplifies, and downconverts) a respective received signal, digitizes the conditioned signal to provide samples, and further processes the samples to provide a corresponding "received" symbol stream.

A receive (RX) data processor 1460 then receives and processes the $N_R$ received symbol streams from $N_R$ transceivers 1454 based on a particular receiver processing technique to provide $N_T$ "detected" symbol streams. The RX data processor 1460 then demodulates, deinterleaves, and decodes each detected symbol stream to recover the traffic data for the data stream. The processing by the RX data processor 1460 is complementary to that performed by the TX MIMO processor 1420 and the TX data processor 1414 at the device 1410.

A processor 1470 periodically determines which pre-coding matrix to use (discussed below). The processor 1470 formulates a reverse link message comprising a matrix index portion and a rank value portion. A data memory 1472 may store program code, data, and other information used by the processor 1470 or other components of the device 1450.

The reverse link message may comprise various types of information regarding the communication link and/or the received data stream. The reverse link message is then processed by a TX data processor 1438, which also receives traffic data for a number of data streams from a data source 1436, modulated by a modulator 1480, conditioned by the transceivers 1454A through 1454R, and transmitted back to the device 1410.

At the device 1410, the modulated signals from the device 1450 are received by the antennas 1424, conditioned by the transceivers 1422, demodulated by a demodulator (DEMOD) 1440, and processed by a RX data processor 1442 to extract the reverse link message transmitted by the device 1450. The processor 1430 then determines which pre-coding matrix to use for determining the beam-forming weights then processes the extracted message.

FIG. 14 also illustrates that the communication components may include one or more components that perform NCL control operations as taught herein. For example, an NCL control component 1490 may cooperate with the processor 1430 and/or other components of the device 1410 to maintain an NCL as taught herein. It should be appreciated that for each device 1410 and 1450 the functionality of two or more of the described components may be provided by a single component. For example, a single processing component may provide the functionality of the NCL control component 1490 and the processor 1430.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology.

UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macrocell, a macro node, a Home eNB (HeNB), a femtocell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 15:
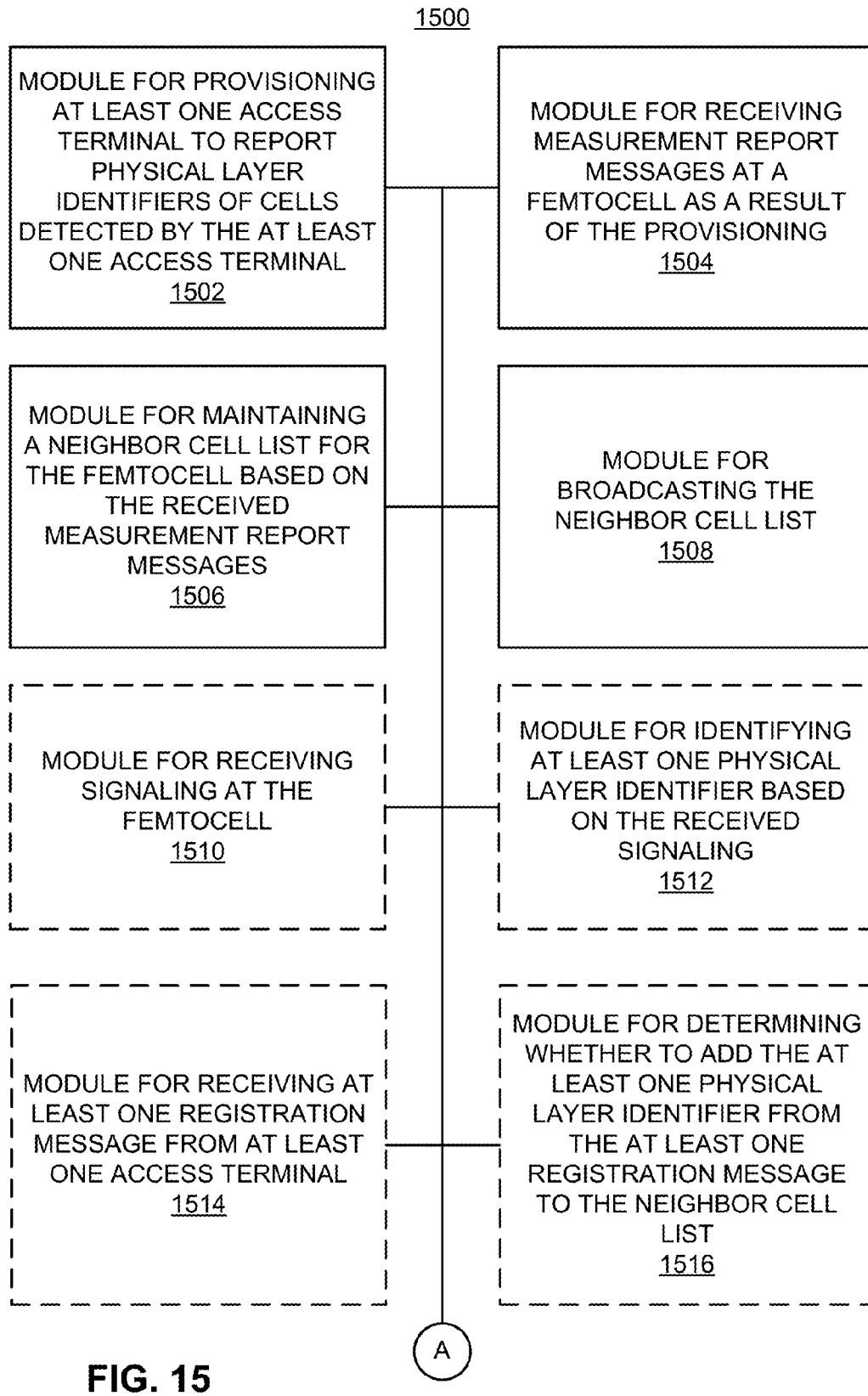
FIGS. 15 and 16 are simplified block diagrams of several sample aspects of an apparatus configured to maintain an NCL as taught herein.
Figure 16:
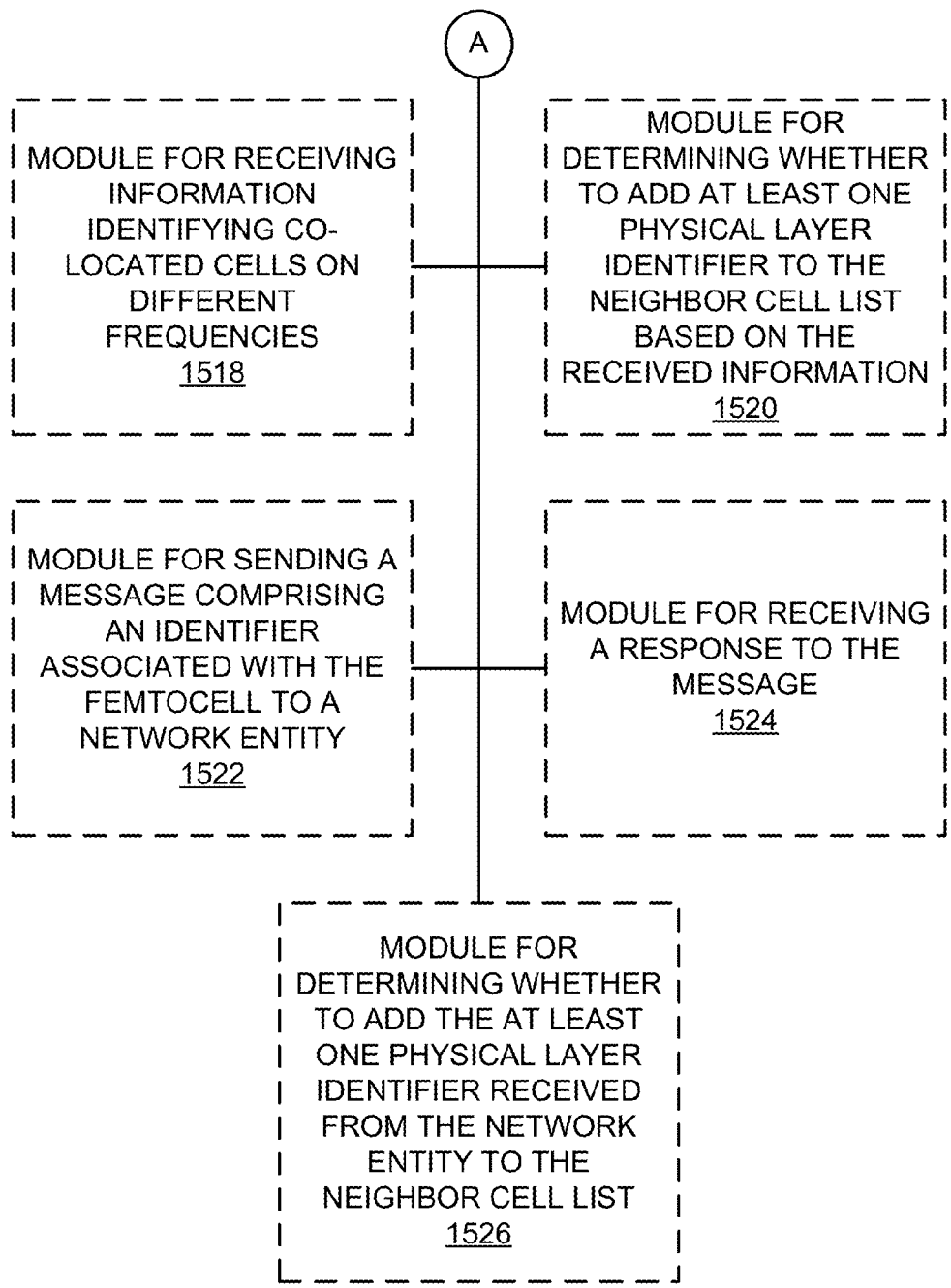

The functionality described herein (e.g., with regard to one or more of the accompanying figures) may correspond in some aspects to similarly designated "means for" functionality in the appended claims. Referring to FIGS. 15 and 16, an apparatus 1500 is represented as a series of interrelated functional modules. Here, a module for provisioning at least one access terminal to report physical layer identifiers of cells detected by the at least one access terminal 1502 may correspond at least in some aspects to, for example, a processing system as discussed herein. A module for receiving measurement report messages at a femtocell as a result of the provisioning 1504 may correspond at least in some aspects to, for example, a communication device as discussed herein. A module for maintaining a neighbor cell list for the femtocell based on the received measurement report messages 1506 may correspond at least in some aspects to, for example, a processing system as discussed herein. A module for broadcasting the neighbor cell list 1508 may correspond at least in some aspects to, for example, a communication device as discussed herein. A module for receiving signaling at the femtocell 1510 may correspond at least in some aspects to, for example, a communication device as discussed herein. A module for identifying at least one physical layer identifier based on the received signaling 1512 may correspond at least in some aspects to, for example, a processing system as discussed herein. A module for receiving at least one registration message from at least one access terminal 1514 may correspond at least in some aspects to, for example, a communication device as discussed herein. A module for determining whether to add the at least one physical layer identifier from the at least one registration message to the neighbor cell list 1516 may correspond at least in some aspects to, for example, a processing system as discussed herein. A module for receiving information identifying co-located cells on different frequencies 1518 may correspond at least in some aspects to, for example, a communication device as discussed herein. A module for determining whether to add at least one physical layer identifier to the neighbor cell list based on the received information 1520 may correspond at least in some aspects to, for example, a processing system as discussed herein. A module for sending a message comprising an identifier associated with the femtocell to a network entity 1522 may correspond at least in some aspects to, for example, a communication device as discussed herein. A module for receiving a response to the message 1524 may correspond at least in some aspects to, for example, a communication device as discussed herein. A module for determining whether to add the at least one physical layer identifier received from the network entity to the neighbor cell list 1526 may correspond at least in some aspects to, for example, a processing system as discussed herein.

The functionality of the modules of FIGS. 15 and 16 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 15 and 16 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for communication, comprising:
 a processing system configured to provision at least one access terminal to report physical layer identifiers of cells detected by the at least one access terminal, wherein the provisioning comprises:
 defining different subsets of a superset of physical layer identifiers, and
 successively transmitting the different subsets to the at least one access terminal to successively identify all cells of the superset that are detectable by the at least one access terminal; and
 a communication device configured to receive measurement report messages as a result of the provisioning, wherein the measurement report messages identify physical layer identifiers of the cells detected by the at least one access terminal, wherein:
 the processing system is further configured to maintain a neighbor cell list for the apparatus based on the received measurement report messages, and
 the communication device is further configured to broadcast the neighbor cell list.

2. The apparatus of claim 1, wherein:
 the apparatus further comprises another communication device configured to receive signaling;
 the signaling is received from a cell;
 the processing system is further configured to identify at least one physical layer identifier based on the received signaling; and
 the maintaining of the neighbor cell list is further based on the identified at least one physical layer identifier.

3. The apparatus of claim 2, wherein:
 the signaling comprises a broadcast channel that includes system information identifying at least one neighbor cell list for the cell;
 the receipt of the signaling comprises decoding the broadcast channel; and
 the identification of the at least one physical layer identifier comprises extracting physical layer identifiers from the at least one neighbor cell list included in the system information.

4. The apparatus of claim 2, wherein the identification of the at least one physical layer identifier comprises detecting a physical layer identifier of the cell from the signaling.

5. The apparatus of claim 1, wherein the provisioning comprises sending at least one message indicating that Detected Set reporting is enabled.

6. The apparatus of claim 1, wherein:
 the provisioning comprises sending at least one message that requests the at least one access terminal to send measurement report messages; and
 the at least one message specifies a set of physical layer identifiers to be searched by the at least one access terminal.

7. The apparatus of claim 1, wherein the definition of the different subsets comprises identifying at least one physical layer identifier that is included in each of the subsets.

8. The apparatus of claim 1, wherein the definition of the different subsets comprises prioritizing the physical layer identifiers of the superset to select a different set of the physical layer identifiers for each of the subsets.

9. The apparatus of claim 1, wherein the definition of the different subsets comprises, for each of the subsets, prioritizing the physical layer identifiers of the subset.

10. The apparatus of claim 9, wherein the prioritization of the physical layer identifiers is based on at least one of: path losses associated with the physical layer identifiers, registrations of idle access terminals at cells associated with the physical layer identifiers, information from events generated during handovers associated with the physical layer identifiers, or how frequently the physical layer identifiers are reported in the received measurement report messages.

11. The apparatus of claim 9, wherein, for each of the subsets, an indication of the prioritization of the physical layer identifiers is transmitted with the subset.

12. The apparatus of claim 1, wherein:
 the communication device is further configured to receive at least one registration message from at least one access terminal that reselects to the apparatus;
 the at least one registration message comprises at least one physical layer identifier; and
 the processing system is further configured to determine whether to add the at least one physical layer identifier from the at least one registration message to the neighbor cell list.

13. The apparatus of claim 1, wherein:
 the apparatus further comprises another communication device configured to receive information identifying co-located cells on different frequencies; and
 the processing system is further configured to determine whether to add at least one physical layer identifier to the neighbor cell list based on the received information.

14. The apparatus of claim 1, wherein:
 the apparatus further comprises another communication device configured to send a message comprising an identifier associated with the apparatus to a network entity;
 the another communication device is further configured to receive a response to the message from the network entity;
 the response comprises at least one physical layer identifier of at least one cell in a neighborhood associated with the apparatus; and
 the processing system is further configured to determine whether to add the at least one physical layer identifier received from the network entity to the neighbor cell list.

15. A method of communication, comprising:
 provisioning at least one access terminal to report physical layer identifiers of cells detected by the at least one access terminal, wherein the provisioning comprises:
 defining different subsets of a superset of physical layer identifiers, and successively transmitting the different subsets to the at least one access terminal to successively identify all cells of the superset that are detectable by the at least one access terminal;

receiving measurement report messages at a femtocell as a result of the provisioning, wherein the measurement report messages identify physical layer identifiers of the cells detected by the at least one access terminal;

maintaining a neighbor cell list for the femtocell based on the received measurement report messages; and broadcasting the neighbor cell list.

16. The method of claim 15, further comprising:

receiving signaling at the femtocell, wherein the signaling is received from a cell; and identifying at least one physical layer identifier based on the received signaling, wherein the maintaining of the neighbor cell list is further based on the identified at least one physical layer identifier.

17. The method of claim 16, wherein:

the signaling comprises a broadcast channel that includes system information identifying at least one neighbor cell list for the cell;

the receipt of the signaling comprises decoding the broadcast channel; and the identification of the at least one physical layer identifier comprises extracting physical layer identifiers from the at least one neighbor cell list included in the system information.

18. The method of claim 16, wherein the identification of the at least one physical layer identifier comprises detecting a physical layer identifier of the cell from the signaling.

19. The method of claim 15, wherein the provisioning comprises sending at least one message indicating that Detected Set reporting is enabled.

20. The method of claim 15, wherein:

the provisioning comprises sending at least one message that requests the at least one access terminal to send measurement report messages; and the at least one message specifies a set of physical layer identifiers to be searched by the at least one access terminal.

21. The method of claim 15, wherein the definition of the different subsets comprises identifying at least one physical layer identifier that is included in each of the subsets.

22. The method of claim 15, wherein the definition of the different subsets comprises prioritizing the physical layer identifiers of the superset to select a different set of the physical layer identifiers for each of the subsets.

23. The method of claim 15, wherein the definition of the different subsets comprises, for each of the subsets, prioritizing the physical layer identifiers of the subset.

24. The method of claim 23, wherein the prioritization of the physical layer identifiers is based on at least one of: path losses associated with the physical layer identifiers, registrations of idle access terminals at cells associated with the physical layer identifiers, information from events generated during handovers associated with the physical layer identifiers, or how frequently the physical layer identifiers are reported in the received measurement report messages.

25. The method of claim 23, wherein, for each of the subsets, an indication of the prioritization of the physical layer identifiers is transmitted with the subset.

26. The method of claim 15, further comprising:

receiving at least one registration message from at least one access terminal that reselects to the femtocell, wherein the at least one registration message comprises at least one physical layer identifier; and determining whether to add the at least one physical layer identifier from the at least one registration message to the neighbor cell list.

27. The method of claim 15, further comprising:

receiving information identifying co-located cells on different frequencies; and determining whether to add at least one physical layer identifier to the neighbor cell list based on the received information.

28. The method of claim 15, further comprising:

sending a message comprising an identifier associated with the femtocell to a network entity;

receiving a response to the message from the network entity, wherein the response comprises at least one physical layer identifier of at least one cell in a neighborhood associated with the femtocell; and determining whether to add the at least one physical layer identifier received from the network entity to the neighbor cell list.

29. An apparatus for communication, comprising:

means for provisioning at least one access terminal to report physical layer identifiers of cells detected by the at least one access terminal, wherein the means for provisioning comprise:

means for defining different subsets of a superset of physical layer identifiers, and means for successively transmitting the different subsets to the at least one access terminal to successively identify all cells of the superset that are detectable by the at least one access terminal;

means for receiving measurement report messages as a result of the provisioning, wherein the measurement report messages identify physical layer identifiers of the cells detected by the at least one access terminal;

means for maintaining a neighbor cell list for the apparatus based on the received measurement report messages; and means for broadcasting the neighbor cell list.

30. The apparatus of claim 29, further comprising:

means for receiving signaling, wherein the signaling is received from a cell; and means for identifying at least one physical layer identifier based on the received signaling, wherein the maintaining of the neighbor cell list is further based on the identified at least one physical layer identifier.

31. The apparatus of claim 29, further comprising:

means for receiving at least one registration message from at least one access terminal that reselects to the apparatus, wherein the at least one registration message comprises at least one physical layer identifier; and means for determining whether to add the at least one physical layer identifier from the at least one registration message to the neighbor cell list.

32. The apparatus of claim 29, further comprising:

means for receiving information identifying co-located cells on different frequencies; and means for determining whether to add at least one physical layer identifier to the neighbor cell list based on the received information.

33. The apparatus of claim 29, further comprising:

means for sending a message comprising an identifier associated with the apparatus to a network entity;

means for receiving a response to the message from the network entity, wherein the response comprises at least one physical layer identifier of at least one cell in a neighborhood associated with the apparatus; and means for determining whether to add the at least one physical layer identifier received from the network entity to the neighbor cell list.

34. A non-transitory computer-readable medium comprising code for causing a computer to:
provision at least one access terminal to report physical layer identifiers of cells detected by the at least one access terminal, wherein the provisioning comprises:
defining different subsets of a superset of physical layer identifiers, and
successively transmitting the different subsets to the at least one access terminal to successively identify all cells of the superset that are detectable by the at least one access terminal;
receive measurement report messages at a femtocell as a result of the provisioning, wherein the measurement report messages identify physical layer identifiers of the cells detected by the at least one access terminal;
maintain a neighbor cell list for the femtocell based on the received measurement report messages; and
broadcast the neighbor cell list.

35. The non-transitory computer-readable medium of claim 34, further comprising code for causing the computer to:
receive signaling at the femtocell, wherein the signaling is received from a cell; and
identify at least one physical layer identifier based on the received signaling, wherein the maintaining of the neighbor cell list is further based on the identified at least one physical layer identifier.

36. The non-transitory computer-readable medium of claim 34, further comprising code for causing the computer to:
receive at least one registration message from at least one access terminal that reselects to the femtocell, wherein the at least one registration message comprises at least one physical layer identifier; and
determine whether to add the at least one physical layer identifier from the at least one registration message to the neighbor cell list.

37. The non-transitory computer-readable medium of claim 34, further comprising code for causing the computer to:
receive information identifying co-located cells on different frequencies; and
determine whether to add at least one physical layer identifier to the neighbor cell list based on the received information.

38. The non-transitory computer-readable medium of claim 34, further comprising code for causing the computer to:
send a message comprising an identifier associated with the femtocell to a network entity;
receive a response to the message from the network entity, wherein the response comprises at least one physical layer identifier of at least one cell in a neighborhood associated with the femtocell; and
determine whether to add the at least one physical layer identifier received from the network entity to the neighbor cell list.

\* \* \* \* \*